United States Patent
Ito et al.

(10) Patent No.: US 8,734,020 B2
(45) Date of Patent: May 27, 2014

(54) BEARING WITH SENSOR

(75) Inventors: Hiroyoshi Ito, Kuwana (JP); Seiichi Takada, Kuwana (JP)

(73) Assignee: NTN Corporation, Osaka (JP)

( * ) Notice: Subject to any disclaimer, the term of this patent is extended or adjusted under 35 U.S.C. 154(b) by 3 days.

(21) Appl. No.: 13/502,534

(22) PCT Filed: Oct. 15, 2010

(86) PCT No.: PCT/JP2010/068163
§ 371 (c)(1),
(2), (4) Date: Apr. 18, 2012

(87) PCT Pub. No.: WO2011/049020
PCT Pub. Date: Apr. 28, 2011

(65) Prior Publication Data
US 2012/0201486 A1    Aug. 9, 2012

(30) Foreign Application Priority Data

Oct. 22, 2009  (JP) ................................ 2009-243205
Apr. 5, 2010   (JP) ................................ 2010-086849
Jun. 30, 2010  (JP) ................................ 2010-149383

(51) Int. Cl.
*F16C 32/00*    (2006.01)
(52) U.S. Cl.
USPC ....................................................... 384/448
(58) Field of Classification Search
CPC ............................... G01P 3/443; F16C 41/007
USPC ......................................................... 384/448
See application file for complete search history.

(56) References Cited

U.S. PATENT DOCUMENTS 3,345,723 A * 10/1967 Stilla et al. ................. 29/898.07
3,401,436 A *  9/1968 Bradshaw ...................... 24/456
4,477,126 A * 10/1984 Price ............................. 384/490

(Continued)

FOREIGN PATENT DOCUMENTS

JP    05-144216    6/1993
JP    2001-135196  5/2001

(Continued)

OTHER PUBLICATIONS

Translation of JP 2009-074687 from JPO website.*

(Continued)

*Primary Examiner* — Marcus Charles
*Assistant Examiner* — Adam D Rogers
(74) *Attorney, Agent, or Firm* — Wenderoth, Lind & Ponack, L.L.P.

(57) ABSTRACT

A bearing assembly with a sensor, includes an annular, synthetic resin sensor holder supported on an outer race using a circumferential groove of the outer race so as to be strongly fixed in position by a spring member having circumferential half-split elastic recovery portions. The spring member is a square sectional wire and includes a main portion fitted in an annular groove of the sensor holder, and opposite end portions that circumferentially protrude from the annular groove and are located inside an open recess of the sensor holder. The opposite end portions of the spring member overlap axially when fitted in the annular groove, and abut and are deflected when one of the end portions is shifted to remove the overlapping. Forces caused by elastic recovery of the deflected end portions increase the force of the main portion pushing the sensor holder in a radially outward direction.

17 Claims, 15 Drawing Sheets

(56) References Cited

U.S. PATENT DOCUMENTS

| | | | |
|---|---|---|---|
| 5,313,849 A * | 5/1994 | Miyata et al. | 73/866.5 |
| 5,490,694 A * | 2/1996 | Shumway | 285/305 |
| 6,808,310 B2 * | 10/2004 | Ooitsu et al. | 384/527 |
| 6,882,142 B2 * | 4/2005 | Koike et al. | 324/174 |

FOREIGN PATENT DOCUMENTS

| | | | |
|---|---|---|---|
| JP | 2005-249545 | | 9/2005 |
| JP | 2008128365 A | * | 6/2008 |
| JP | 2009-074687 | | 4/2009 |

OTHER PUBLICATIONS

Translation of JP 2001-135196 from JPO website.*

Translation of JP 05-144216 from JPO website.*

"Leaf Spring" from dictionary.reference.com. Retrieved Jul. 12, 2013.*

International Search Report issued Jan. 11, 2011 in International (PCT) Application No. PCT/JP2010/068163.

English translation of the Written Opinion of the International Searching Authority issued Jan. 11, 2011 in PCT/JP2010/068163.

* cited by examiner

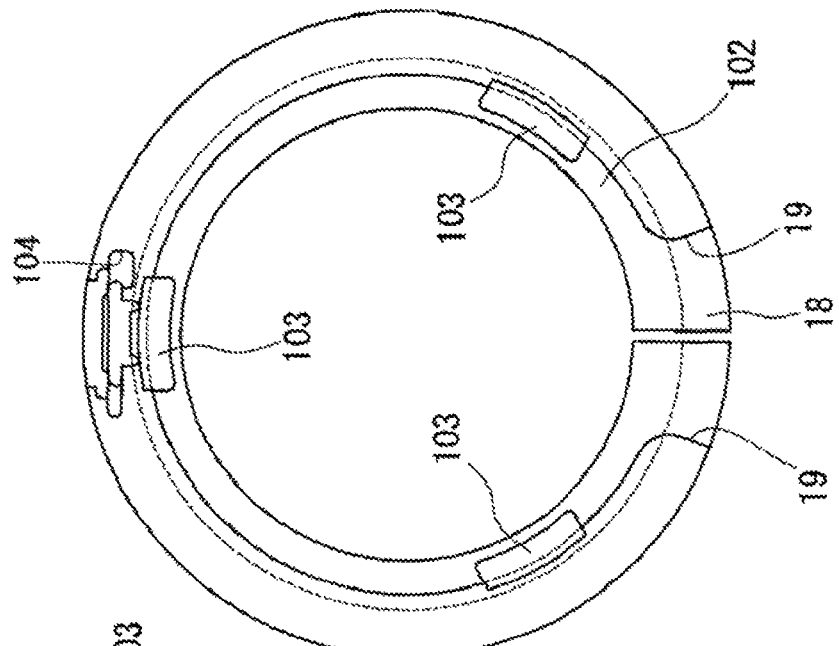
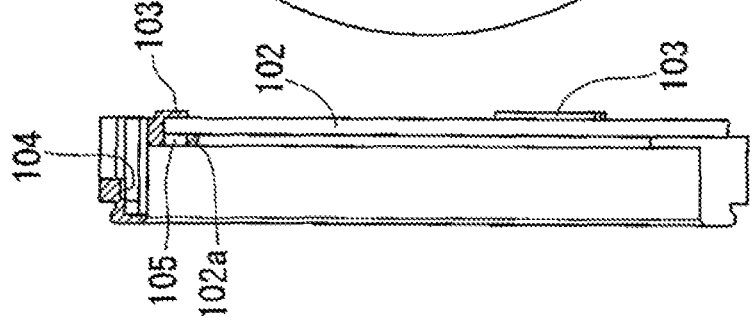
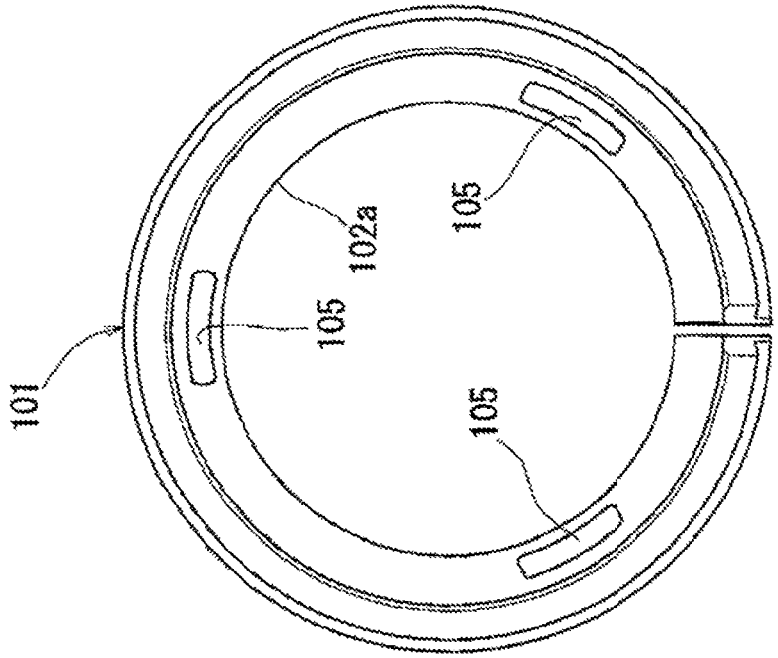

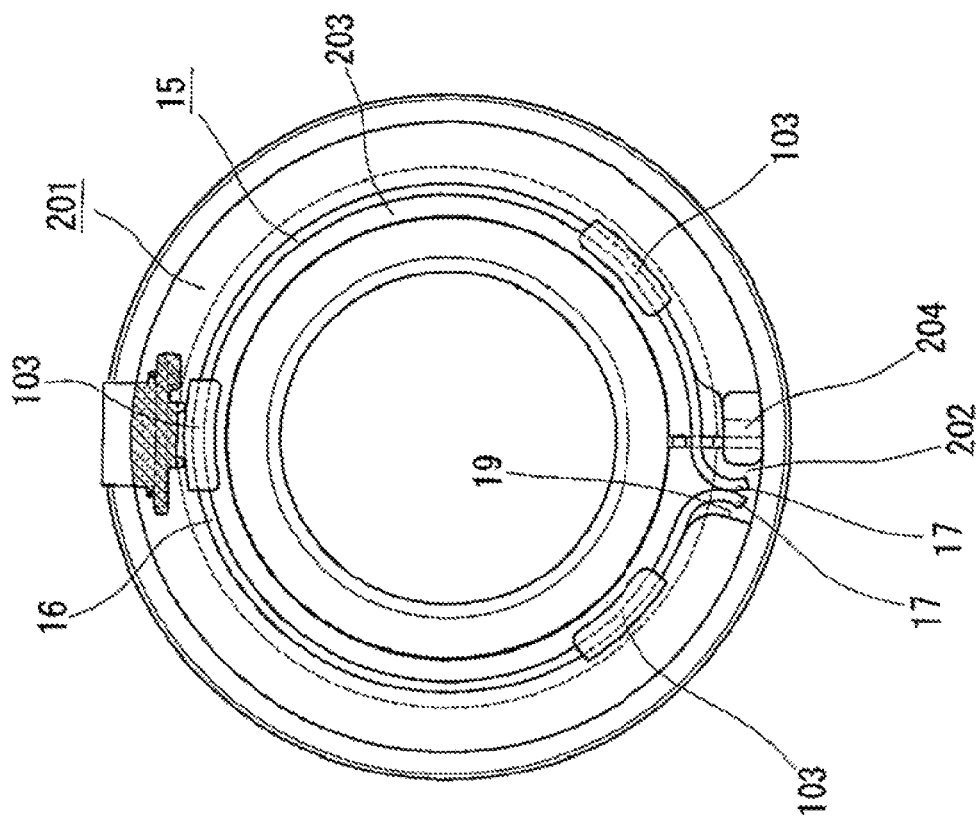
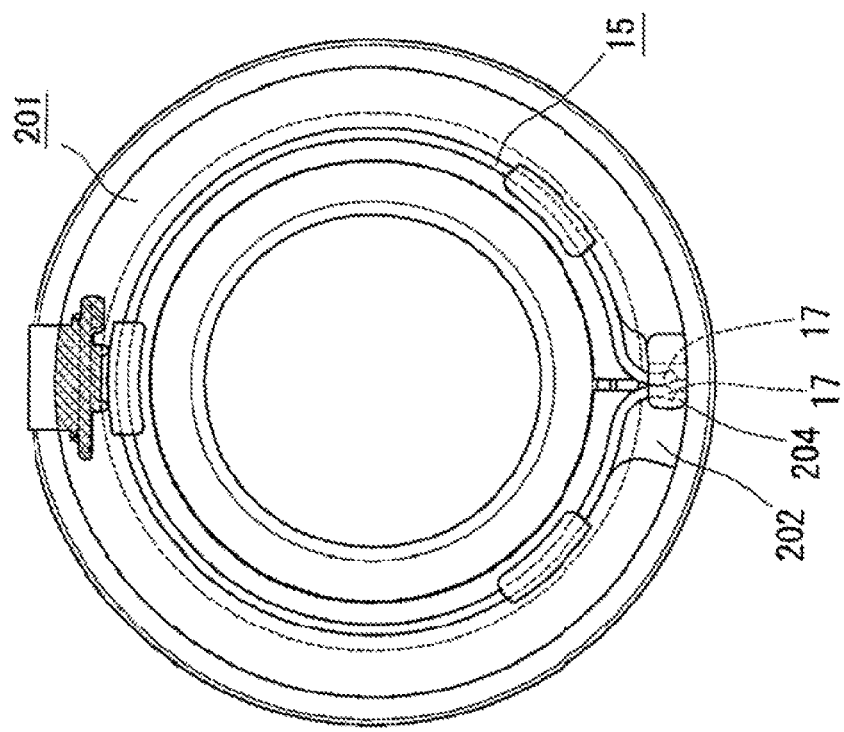

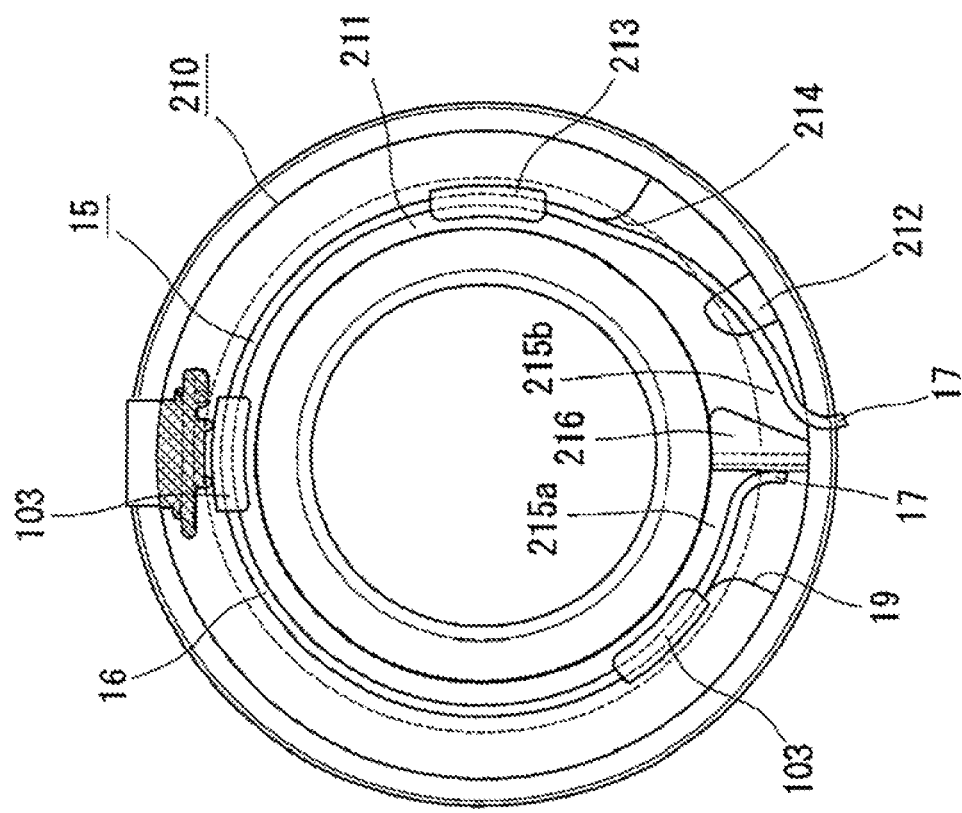
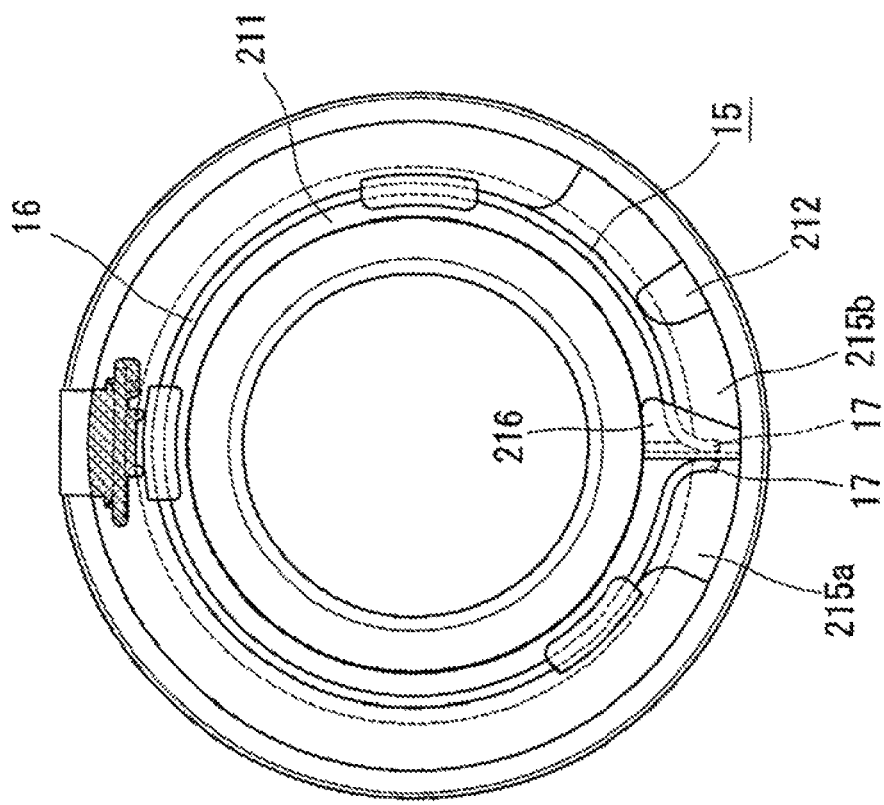

Fig. 18(c)
Fig. 18(a)
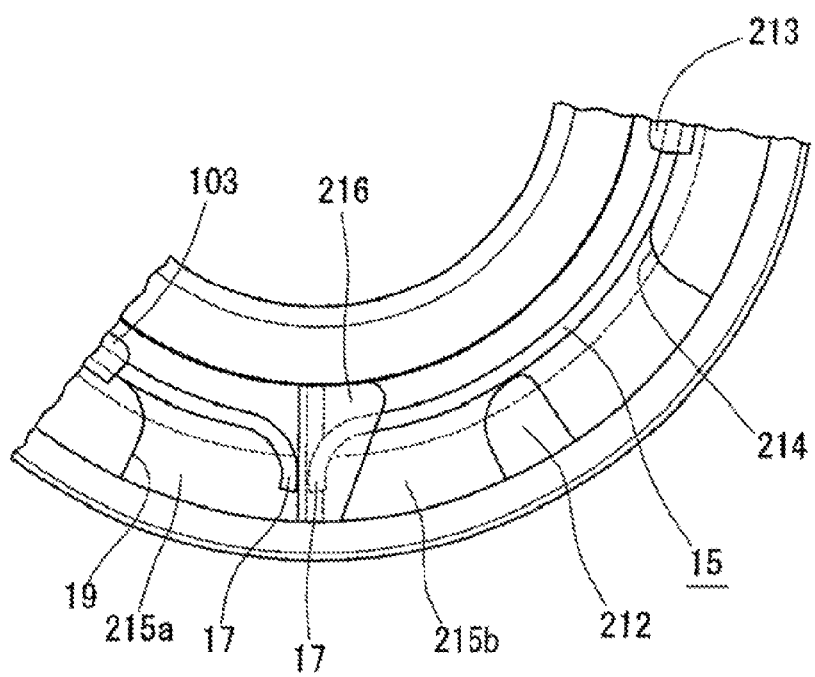
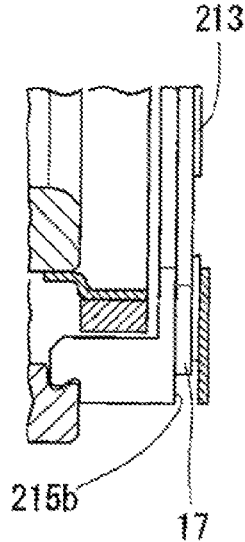
Fig. 18(b)
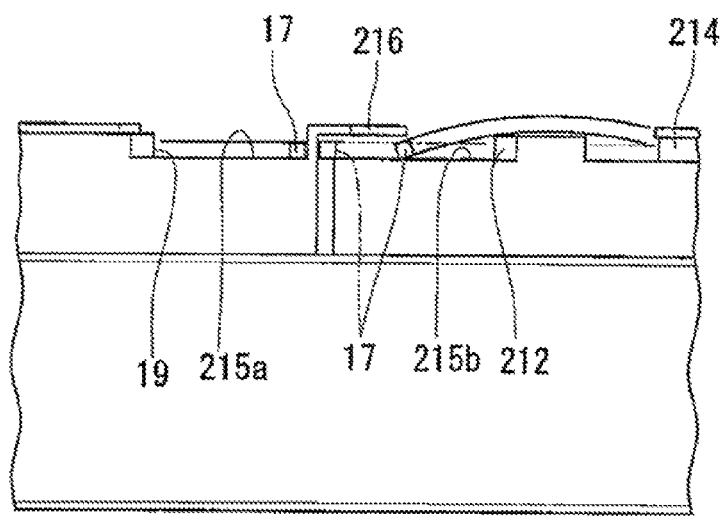

BEARING WITH SENSOR

CROSS REFERENCE TO RELATED APPLICATIONS

The present application is the U.S. National Stage of International Application PCT/JP2010/068163, filed Oct. 15, 2010, and claims foreign priority of JP 2009-243205, filed Oct. 22, 2009, JP 2010-086849, filed Apr. 5, 2010, and JP 2010-149383, filed Jun. 30, 2010.

BACKGROUND OF THE INVENTION

1. Field of the Invention

This invention relates to a bearing assembly including a rolling bearing and a sensor for detecting e.g. rotational angle, temperature or vibration.

2. Description of Related Art

Bearing assemblies of this type are typically used to control e.g. the rotational speed, rotational direction or rotational angle of a motor shaft or an axle of an automobile. The rolling bearing of such a bearing assembly includes a stationary bearing race adapted to be fitted to a stationary member such as a motor housing or an automotive suspension, and a rotary bearing race adapted to be coupled to a rotary shaft. A sensor holder carrying a sensor and wires is supported on the stationary bearing race (see e.g. Japanese Unexamined Patent Application Publication No. 2005-249545).

The sensor holder is typically formed by injection-molding e.g. a thermoplastic resin because such a holder can be formed easily and insulated easily. If the outer race of the rolling bearing is used as the stationary bearing race, the sensor holder is provided with a positioning portion formed with a rib. The positioning portion is fitted into the outer race from one axial end of the outer race until the rib is engaged in a circumferential groove formed in the radially inner surface of the outer race, thus radially positioning the sensor holder relative to the outer race while preventing separation of the sensor holder by the engagement of the rib and the peripheral wall of the circumferential groove. The sensor holder is thus supported by the outer race. (See for example Japanese Unexamined Patent Application Publication No. 2009-074687).

The sensor holder disclosed in Japanese Unexamined Patent Application Publication No. 2009-074687 is an annular member having circumferential ends. The circumferential ends of the sensor holder can be moved toward and away from each other by elastically deforming the sensor holder. When fitting the positioning portion in the outer race, the sensor holder is elastically deformed so that its circumferential ends move toward each other, thereby allowing the rib to be easily engaged in the circumferential groove of the outer race. With the sensor holder supported by the outer race, the sensor holder is fitted in a radially compressed state. Thus, the spring member applies to the sensor holder a spring force that tends to move its circumferential ends away from each other, thereby more rigidly fixing the sensor holder to the outer race.

Typically, the spring member is a C-shaped, snap ring-shaped, circular member which can be fitted in an annular groove formed in the sensor holder so as to extend between the circumferential ends of the sensor holder and having circumferential ends. When the spring member is fitted in the annular groove with its circumferential ends located close to each other, the spring member elastically pushes the sensor holder radially outwardly, and the spring member can be fixed to the sensor holder.

In a different arrangement, with the rib fitted in the circumferential groove, a spring member is pushed into between circumferential ends of the sensor holder and secured to the sensor holder. This spring member comprises free end portions adapted to be deflected when the sensor holder is pushed into between the circumferential ends of the sensor holder, and an intermediate portion connecting together the free end portions. Using the elastic force when the free end portions are deflected, the circumferential end portions of the sensor holder are biased away from each other. This elastic force also serves to more strongly fix the spring member In Japanese Unexamined Patent Application Publication No. 2009-074687, to easily secure the spring member to the sensor holder, the spring member is provided with circumferential half-split elastic recovery portions having a split structure, like a snap ring shape or a split groove shape caused by the free end portions.

However, in the spring member disclosed in Japanese Unexamined Patent Application Publication No. 2009-074687, the sensor holder is strongly fixed depending on the elastic recovery characteristic of both of the elastic recovery portions having the split structure. The elastic recovery portion itself has the limitation of increasing the elastic recovery characteristic. As such, when a diameter of the sensor holder is increased corresponding to an increase in diameter of the outer race, there is a possibility of being insufficient to strongly fix the sensor holder. For example, since a bending radius of the concentric C-shaped, snap ring-shaped spring member having the circumferential half-split elastic recovery portions becomes large, the spring forces transferred to the opposite end sides of the sensor holder have a tendency toward reduction. Further, the spring member, in which opposite free end portions are formed as the circumferential half-split elastic recovery portions, is formed by injection molding. As such, the spring member lacks the elastic recovery characteristic of the free end portions, and thus there is no choice but to increase the elastic recovery characteristic within a range in which injection molding synthetic resins are selected.

SUMMARY OF THE INVENTION

Thus, an object of the present invention is to provide a bearing assembly with a sensor, in which a sensor holder formed of an annular member having ends formed of a synthetic resin is supported on an outer race using a circumferential groove of the outer race of a rolling bearing, and thereby the sensor holder is adapted to be strongly fixed in position by the spring member having circumferential half-split elastic recovery portions, so that the sensor holder can be adapted to be more strongly fixed in position.

According to a first aspect of the present invention in order to achieve the aforementioned object, there is provided a bearing assembly with a sensor, which includes a rolling bearing whose outer race is mounted on a stationary member, and a sensor holder that is made of a synthetic resin and carries the sensor. The sensor holder includes a positioning portion fitted onto a radially inner surface of the outer race from a first axial side thereof. The positioning portion includes a rib fitted in a circumferential groove formed in the radially inner surface of the outer race, and the sensor holder is an annular member having ends, and is supported on the outer race by fitting the positioning portion. In the state in which the sensor holder is supported on the outer race, a spring member is mounted in a compressed state. Thereby, the sensor holder is strongly fixed in position by elastic recovery of the spring member.

According to the first aspect of the present invention, in the bearing assembly, the spring member may be fitted in an annular groove extending between the opposite ends of the sensor holder as the annular member having ends. The spring member may include a main portion fitted in the annular groove, and opposite end portions circumferentially protruding from the annular groove. The opposite end portions of the spring member may be portions that abut each other and are deflected in the state in which the main portion is fitted in the annular groove. Spring forces by which the sensor holder is strongly fixed in position may be increased by elastic recovery of the deflected opposite end portions.

According to the first aspect of the present invention, the sensor holder can be strongly fixed in position by elastic recovery of the main portion of the spring member fitted in the annular groove of the sensor holder. Furthermore, the spring forces by which the sensor holder is strongly fixed in position can be increased by the deflection of the opposite end portions of the spring member.

More particularly, the opposite end portions of the spring member may overlap in an axial direction with the main portion fitted in the annular groove, and when the opposite end portions are located at the same axial position by slightly shifting one of the end portions, the opposite end portions may be in the abutting and deflected state.

When one of the opposite end portions, which overlap in the axial direction with the main portion fitted in the annular groove, is slightly shifted to cause the opposite end portions to be located at the same axial position, an elastic recovery force can be accumulated on the shifted end portion, and the opposite end portions may be in abutment with each other. In this state, the remaining other end portion receiving the elastic recovery of the shifted end portion is deflected toward the opposite side. The spring forces by which the sensor holder is strongly fixed in position can be increased using the elastic recovery associated with the deflection of the opposite end portions.

The spring member may be formed of a formed-wire spring, and a first axial side surface of the sensor holder may be provided with an open recess to which the opposite end portions of the spring member are exposed. When the opposite end portions of the spring member are in abutment with each other, the opposite end portions may be supported in the axial direction by a bottom surface of the open recess.

If the spring member is the formed-wire spring, it is easy to shift the axially overlapping opposite end portions of the spring member. If the open recess to which the opposite end portions of the spring member are exposed is formed in the first axial side surface of the sensor holder, the main portion of the spring member can be pushed into the annular groove of the sensor holder from the first axial side, and the opposite end portions of the spring member can be positioned in the open recess, so that the abutting opposite end portions of the spring member can be supported in the axial direction by the bottom surface of the open recess. Due to this support, the abutting opposite end portions can be prevented from deviating from each other in the axial direction. Further, since the abutting opposite end portions are located in the open recess, they can be prevented from coming in contact with other portions. Accordingly, even when the formed-wire spring is employed, the abutment between the opposite end portions may be prevented from being unexpectedly released.

Particularly, if the spring member is formed of a square-sectional wire having axial surfaces, and if the surfaces are abutment surfaces of the opposite end portions of the spring member, the opposite end portions of the spring member do not easily deviate from each other due to axial sliding from the abutment state, compared to the formed-wire spring of a round wire.

In the first aspect, since the deflection is caused by the abutment state of the end portions of the spring member, means for securing this abutment state is preferably employed.

That is, when the sensor holder has an end stop structure in which, in the state in which the spring member is mounted and fixed to the outer race, and axial displacement of at least one of the opposite end portions of the spring member is restricted to a range in which the abutment is maintained, the end portions of the spring member of the annular member having ends can be prevented from deviating from respective abutment counterparts due to the deflection in the vicinity of the end portions.

Here, in the first aspect, since the abutment counterparts of the end portions of the spring member may be both of the end portions of the spring member or the sensor holder, a proper end stop structure can be employed depending on an employed abutment structure.

For example, when the abutment between the end portions of the spring member is employed, the end stop structure may include an open recess that is formed so as to be able to axially support the opposite end portions of the spring member at a first end side of the sensor holder, and a facing wall portion that forms an axial gap so as to circumferentially run from the open recess, through between the opposite ends of the sensor holder, to the other end side of the sensor holder.

In greater detail, in the state in which the main portion is fitted in the annular groove, the opposite end portions of the spring member may be inserted into the open recess from the first axial side. When the opposite end portions of the spring member are located at the same axial position by shifting one of the axially overlapping opposite end portions of the spring member, the opposite end portions of the spring member which are axially supported in the open recess and the annular groove may be in the abutting and deflected state. In this state, when the entire spring member is circumferentially rotated in directions in which the opposite end portions of the spring member move toward the facing wall portion, the opposite end portions of the spring member may be received in the axial gap.

By causing the end portions of the spring member to be in the abutment state, and by causing this state to be maintained by support of the open recess or the annular groove, the entire spring member can be rotated in the circumferential direction. Accordingly, if the axial gap circumferentially extending in the open recess is defined by the facing wall portion, the opposite end portions of the spring member can be inserted into the axial gap by rotation of the entire spring member. Here, only by stopping rotation of the spring member, the axial displacement of the opposite end portions of the spring member can be restricted by the facing wall portion.

For example, when the abutment between the end portions of the spring member and the sensor holder is employed, the end stop structure may include a support wall that protrudes up to a circumferential extension of the annular groove at the second end side of the sensor holder in which a length of the annular groove is shorter than that at the first end side of the sensor holder, a first open recess that axially supports the first end portion of the spring member at the first end side of the sensor holder, a facing wall portion that protrudes so as to form an axial gap at the second end side of the sensor holder, and a second open recess that is formed at a circumferential intermediate portion between the facing wall portion and the support wall so as to line up with the axial gap of the facing wall portion.

In greater detail, in the state in which the main portion is fitted in the annular groove, the first end portion of the spring member is inserted into the first open recess from the first axial side. The first end portion of the spring portion which is axially supported in the first recess abuts the facing wall portion. In this state, the second end portion of the spring member is deflected toward the first axial side and in a radially outward direction, and is inserted into the axial gap across the support wall. When the deflection is released again, the second end portion of the spring member is allowed to abut the facing wall portion in the axial gap.

First, the operation of causing the first end portion of the spring member to abut the facing wall portion can be easily performed within the first open recess. If the length of the annular groove is set to be short at the second end side of the sensor holder, although the main portion of the spring member is fitted and the first end portion of the spring member is in the abutment state, it is easy for the second end portion of the spring member to be deflected toward the radially outer side, be pulled out of the facing wall portion from the second open recess, be inserted into the axial gap from the radially outer side, and abut the facing wall portion. When the annular groove is merely set to be short, there is a risk of separation of the end portion of the spring member after the abutment state due to the deflection of the spring member. As both the support wall that protrudes up to the circumferential extension of the annular groove and the second open recess that is formed at a circumferential intermediate portion between the facing wall portion and the support wall so as to line up with the axial gap of the facing wall portion, the second end portion of the spring member is easily deflected toward the first axial side and the radially outer side, and inserted into the axial gap across the support wall, and the aforementioned risk can be prevented in the abutment state by the support wall. In comparison with the case in which the second end portion of the spring member extends to run across the support wall to an approximately axial depth of the annular groove and then is deflected axially, the second end portion of the spring member is required to be greatly deflected toward the radially outer side in order to be pulled out of the facing wall portion. Accordingly, although the support wall is added, the second end portion of the spring member preferably facilitates deflection in the radially outward direction. Due to deflection-back of releasing the state of crossing the support wall, the opposite end portions of the spring member can be circumferentially pushed into the facing wall portion, and be in the abutting and deflected state again. Simultaneously, the opposite end portions of the spring member can also be restricted by the facing wall portion.

According to a second aspect of the present invention, in the bearing assembly, the spring member may include free end portions that are pushed in and deflected between the opposite ends of the sensor holder, and an intermediate portion interconnecting the free end portions. The intermediate portion may be a bent spring portion compressed due to the push-in, and spring forces by which the sensor holder is strongly fixed in position may be increased by an elastic recovery force of the intermediate portion.

If the intermediate portion is a bent spring portion compressed due to the push-in, the elastic recovery force of the intermediate portion is transferred to the free end portions. As such, this is used to further enhance forces by which the free end portions cause the opposite ends of the sensor holder to be biased away from each other. Thereby, the spring forces by which the sensor holder is strongly fixed in position can be increased.

For example, if the spring member has an M shape when viewed from one side, the intermediate portion can be the bent spring portion.

When the forces by which the deflected free end portions of the spring member pushes the opposite ends of the sensor holder are enhanced, the spring member is easily deflected radially relatively to the sensor holder in reaction to the enhancement. This reaction may be absorbed by the opposite ends of the sensor holder. However, the spring member is preferably stabilized again.

For example, the sensor holder may be provided with an open recess into which the spring member is pushed from the first axial side. Tips of the free end portions may protrude in a circumferential direction further than contact zones with the ends of the sensor holder when viewed from one side. The tips of the free end portions and inner walls of the open recess may be hooked to radially position the spring member.

If the open recess into which the spring member is pushed from the first axial side is formed in the sensor holder, the free end portions can be pushed in between inner wall portions of the open recess within the opposite ends of the sensor holder. Furthermore, the tips of the free end portions can protrude in the circumferential direction further than the contact zones with the ends of the sensor holder when viewed from one side. The tips of the free end portions and inner walls of the open recess can be hooked to radially position the spring member. Thereby, the spring member is further stabilized.

According to a third aspect of the present invention, in the bearing assembly, the spring member may include circumferential half-split elastic recovery portions. The spring member may be rolled from opposite ends toward a middle thereof so as to form a rolled shape. Due to the push-in, the opposite rolled portions are deflected so as to move toward the middle of the spring member between the opposite ends of the sensor holder, and thus the sensor holder is strongly fixed in position by elastic recovery. Middle sides of the opposite rolled portions abut and are deflected, and thus spring forces by which the sensor holder is strongly fixed in position are increased by elastic recovery.

If the spring member is rolled from the opposite ends toward the middle thereof so as to form the rolled shape, the opposite rolled portions can be compressed between the opposite ends of the sensor holder, because the spring member is pushed between the opposite ends of the sensor holder. Thereby, the opposite rolled portions are deflected so as to move toward the middle of the spring member between the opposite ends of the sensor holder, so that the sensor holder can be strongly fixed in position by the elastic recovery. Furthermore, if the middle sides of the opposite rolled portions are adapted to abut and be deflected, forces by which counter middle sides of the opposite rolled portions cause the opposite ends of the sensor holder to be biased away from each other are enhanced by the elastic recovery associated with the deflection of the middle sides of the opposite rolled portions. Thereby, the spring forces by which the sensor holder is strongly fixed in position can be increased.

According to a fourth aspect of the present invention, in the bearing assembly, the spring member may include free end portions that are pushed in and deflected between the opposite ends of the sensor holder, and an intermediate portion interconnecting the free end portions. The spring member may be formed of a leaf spring using a planar steel material.

In comparison with the case in which the spring member is formed of a synthetic resin spring, the leaf spring using the steel material allows the intermediate portion to be thinned using high rigidity of a steel plate, and allows the free end portions to be lengthened, thereby enhancing an elastic recovery characteristic. As such, the forces by which the free end portions cause the opposite ends of the sensor holder to be biased away from each other can be enhanced. That is, the spring forces by which the sensor holder is strongly fixed in position can be increased.

In the bearing assembly of the present invention, the rolling bearing may include an inner race onto which a magnetic encoder of a rotation sensor unit is fitted. The sensor may be a magnetic sensor of the rotation sensor unit. The outer race may be a race having seal grooves formed in a radially inner surface thereof at respective end portions. The circumferential groove may be the seal groove of the first axial side. The sensor holder and the magnetic encoder may define a labyrinth seal that is open in a radially inward direction. Since the seal grooves of the outer race are used to fix the sensor holder, a standard outer race may be applied as the outer race. Instead of mounting a seal member on the first axial side, the labyrinth seal is defined by the magnetic encoder fitted in the inner race and the sensor holder, so that the protection of the inside can be promoted. Since the labyrinth seal is formed so as to be open in the radially inward direction, a radial width of the side surface of the sensor holder ranges from the seal grooves of the outer race to the first axial side of the magnetic encoder. A space that forms a recess for pushing the spring member in can be secured using the radial width.

When the bearing assembly is assembled into an apparatus or is in operation, the sensor holder is expected to receive forces such as expansion or contraction caused by a change in temperature, vibration, and impact. When any of the first to fourth aspects is employed, the structure in which the spring member is inserted into the sensor holder from the first axial side may have a problem in which, when the spring member deviates from a normal position toward the first axial side, the spring member falls away, or else fixing assistance of the sensor holder becomes weak. As such, the sensor holder is unstably fixed, and the sensor is subjected to the adverse influence on the detection. For this reason, it is preferable to reliably prevent the spring member from coming out of the sensor holder, and to positively fix the sensor holder and the outer race.

For example, the first axial side surface of the sensor holder may be provided with anti-separation portions that axially face the spring member abutting the sensor holder from the first axial side.

If the mounting structure of the spring member abutting the sensor holder from the first axial side is employed, the spring member may be configured to avoid removal from the sensor holder toward the second axial side. If the first axial side surface of the sensor holder is provided, the anti-separation portions that face the abutting spring member from the first axial side may be installed in proper arrangement and shape without being restricted by a structure inside the sensor holder, sensor disposition, and a shape of the spring member. Accordingly, the spring member can be reliably positioned in the axial direction relative to the sensor holder.

When the first aspect is employed, the first axial side surface of the sensor holder may be provided with anti-separation portions that axially face the spring member abutting a groove sidewall of a second axial side of the annular groove from the first axial side.

In the first aspect in which the spring member is relatively long in the circumferential direction compared to the other aspects, the anti-separation portions may be installed as a first axial side groove sidewall which continuously extends between the opposite ends of the sensor holder of the annular groove in the circumferential direction. However, as long as the spring member is retained in the axial direction so that the opposite end portions of the spring member are not offset from each other in the axial direction, the anti-separation portions may be installed only at a plurality of circumferential points.

Here, it is preferable that the anti-separation portions be installed on opposite circumferential sides of the sensor holder, between which a middle is one circumferential point located at a side diametrically opposite a facing gap between the opposite ends of the sensor holder fixed to the outer race with the spring member mounted, that a circumferential gap be formed between the anti-separation portions located nearest and next nearest the circumferential end on the same side as each circumferential side of the sensor holder in a circumferential direction, and that the spring member be allowed to be inserted into the annular groove through the circumferential gap between the opposite circumferential sides of the sensor holder.

When the anti-separation portions are installed, the first axial side groove sidewall is considered to be installed in the annular groove. As such, the anti-separation portions are required to be pulled from the radially inner side, and the spring member is required to be compressed more than necessary, compared to the case in which the spring member is fitted in the annular groove that is entirely open to the first axial side without the first axial side groove sidewall. As described above, if the circumferential gap is adapted to be circumferentially formed between the anti-separation portions located nearest and next nearest the circumferential end on the same side as each circumferential side of the sensor holder, and if the spring member is adapted to be inserted into the annular groove through the circumferential gap between the opposite circumferential sides of the sensor holder, the spring member is easily reduced in diameter, compared to the case in which the nearest anti-separation portion continuously extends between the circumferential opposite sides. As such, the spring member can be easily fitted even when the anti-separation portions are added.

In greater detail, the anti-separation portions may be installed at the middle and at each point at which each circumferential side is ahead of the middle by an angle of 120°.

While the spring member is easily fitted, the spring member can be well-balanced on an entire circumferential zone by the anti-separation portions of the three points.

The anti-separation portions may be integrally formed with the sensor holder.

If the anti-separation portions are integrally formed with the sensor holder, there is no trouble of separately preparing anti-separation portions to assemble the sensor holder. To use a material other than a synthetic resin as the material of the anti-separation portion, a sensor holder to which separate anti-separation portions are fixed may be used.

The sensor holder may be formed of a polyamide-imide resin as a main material by injection molding.

Since the polyamide-imide resin is a type in which a temperature creep is low among injection molding resins, the polyamide-imide resin is suitable for preventing the spring member from being separated by the temperature creep of the sensor holder.

In the first to fourth aspects, the sensor may include an integrated circuit having a plurality of magnetic sensors of the rotation sensor unit.

When the rotation sensor unit is employed, for example, the magnetic sensor may be disposed so as to radially face the magnetic encoder attached to the inner race of the rolling bearing.

Since a magnetic gap is set in a radial direction, the magnetic sensor can make it difficult for rotation vibration to influence the magnet encoder during magnetic detection.

Since the spring member can be prevented from being separated from the sensor holder in the axial direction, the sensor holder is prevented from being axially displaced to disturb a normal disposition relation between the magnetic sensor and the magnetic encoder.

When the sensor having the integrated circuit is employed, a circuit board on which the sensor and a connector are mounted is provided, and the circuit board is inserted into a recess of the sensor holder. Thereby, the circuit board can be positioned relative to the sensor holder.

The connector may be radially disposed by wiring.

Since the wiring is radially withdrawn from the sensor holder, the wiring can be prevented from being in the way when the spring member is inserted into the sensor holder from the first axial side.

According to the prevent invention, in the bearing assembly configured so that the sensor holder that is formed of a synthetic resin and is the annular member having ends is supported on the outer race using the circumferential groove of the outer race of the rolling bearing, and so that the sensor holder is adapted to be strongly fixed in position by the spring member having the circumferential half-split elastic recovery portions, the sensor holder can be more strongly fixed in position, because the spring forces by which the sensor holder is strongly fixed in position as described above can be increased.

BRIEF DESCRIPTION OF THE DRAWINGS

FIG. 14(a) is a side view showing a sensor holder of the tenth embodiment from a second axial side, FIG. 14(b) is a sectional view showing the same section as FIG. 12, and FIG. 14(c) is a side view showing the sensor holder of the tenth embodiment from a first axial side.

FIG. 15(a) is a side view showing a part of the process of mounting a spring member in a sensor holder of an eleventh embodiment from a first axial side, and FIG. 15(b) is a side view showing the sensor holder in which the spring member of the eleventh embodiment is mounted from the first axial side.

FIG. 17(a) is a side view showing a part of the process of mounting a spring member in a sensor holder of a twelfth embodiment from a first axial side, and FIG. 17(b) is a side view showing the sensor holder in which the spring member of the twelfth embodiment is mounted from the first axial side.

FIG. 18(a) is a partially enlarged view of an end stop structure of FIG. 17(b), FIG. 18(b) is an enlarged bottom view of the end stop structure of FIG. 17(a), and FIG. 18(c) is a sectional view corresponding to line c-c of FIG. 16(b).

DETAILED DESCRIPTION OF THE INVENTION

The embodiments are now described with reference to the drawings.

Figure 1:
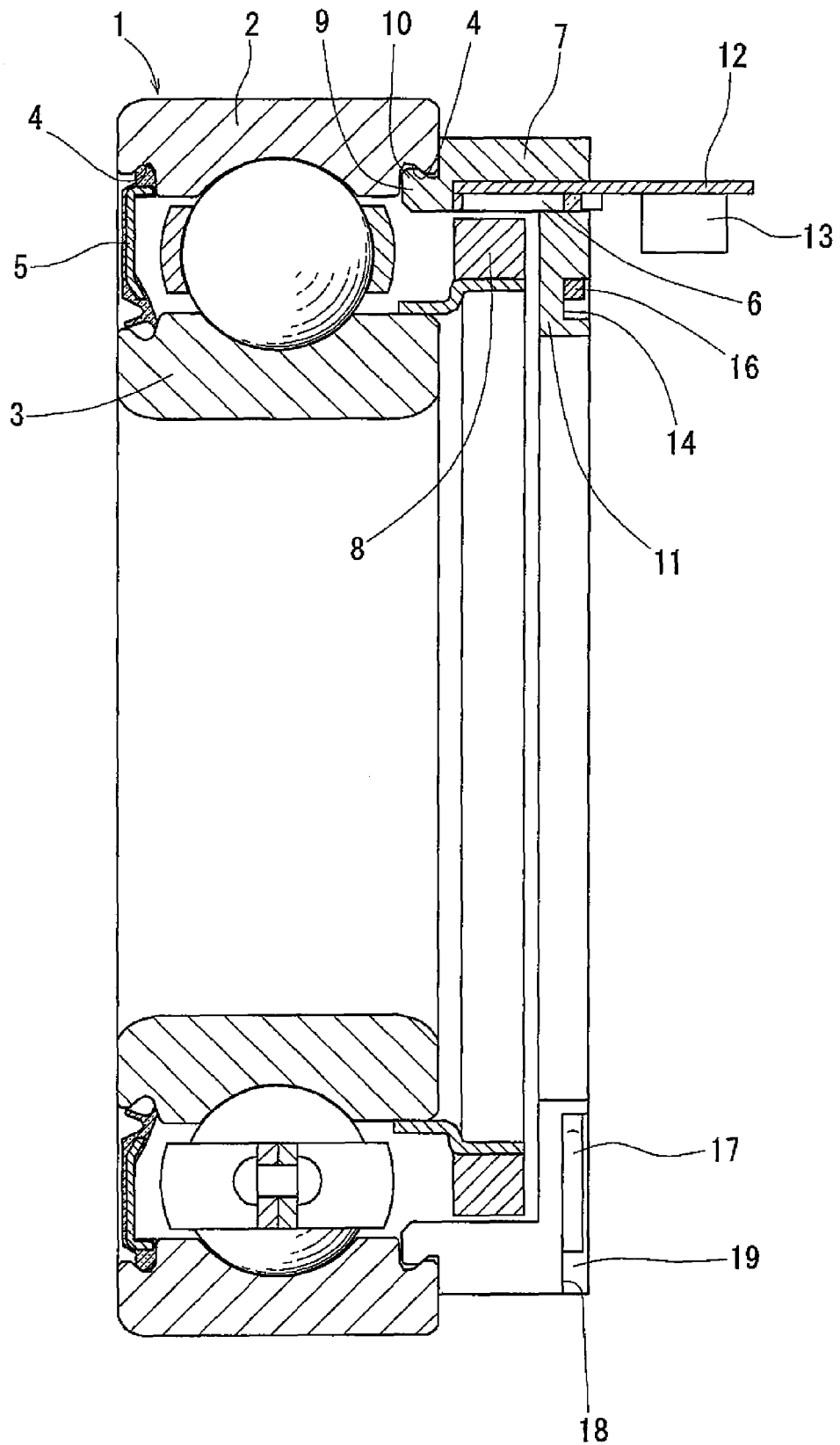
FIG. 1 is a sectional view showing a bearing assembly with a sensor according to a first embodiment, in which a bearing central axle and a sensor holder are cut from the top at a position at which they are circumferentially bisected.
Figure 2:
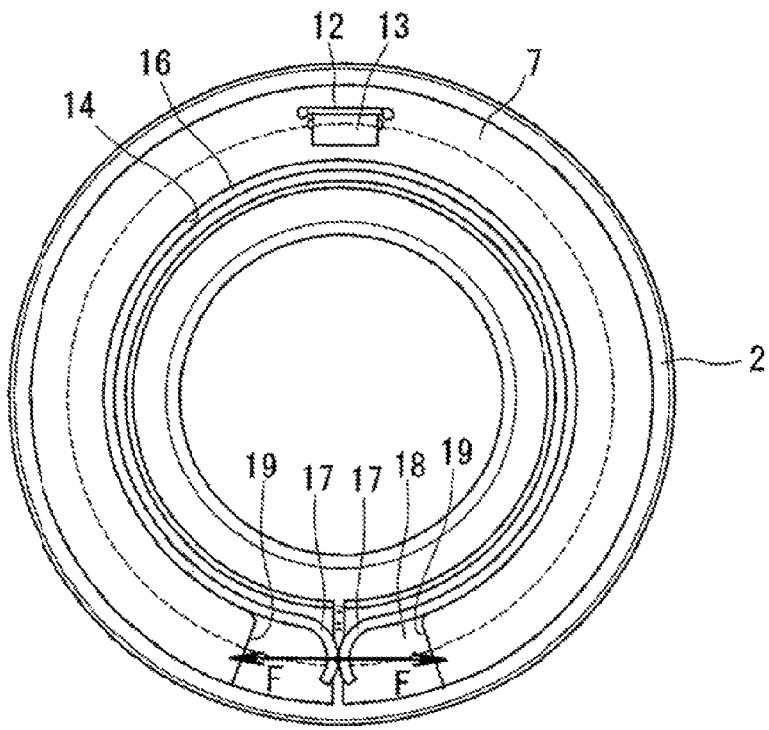
FIG. 2 is a side view showing the bearing assembly with a sensor of FIG. 1 from a first axial side.

The bearing assembly with a sensor of the first embodiment is, as shown in FIGS. 1 and 2, a rolling bearing 1 with a rotation sensor unit. The rolling bearing 1 includes an outer race 2 mounted to a stationary member (not shown), and an inner race 3 mounted on a rotary shaft (not shown). The outer race 2 is formed with seal grooves 4 on its radially inner surface at the respective end portions. A seal 5 can be fitted in each seal groove 4. The rotation sensor unit is a magnetic rotation sensor unit including a magnetic sensor 6 and a magnetic encoder 8. A sensor holder 7 made of a synthetic resin and carrying the sensor 6 is mounted to the outer race 2. The term "rotation sensor unit" herein used refers to a sensor unit capable of producing at least one of electric detection signals indicative of a rotational angle, a rotational speed, and a rotational direction, respectively. The magnetic encoder 8 of the magnetic rotation sensor unit is fitted onto the radially outer surface of the inner race 3 from its first axial end. The magnetic encoder 8 is an endless annular member comprising an encoder portion in the form of a rubber magnet on which N- and S-poles are arranged alternately with each other in the circumferential direction, and a metal core. If the rubber magnet is bonded to the metal core by vulcanization, the rubber magnet may be made of NBR, HNBR, a fluorine material or a silicone material. The "axial direction" herein used refers to the direction parallel to the central axis of the rolling bearing 1; the "radial direction" herein used refers to any direction perpendicular to the central axis of the rolling bearing 1; and the "circumferential direction" herein used refers to the circumferential direction around the central axis of the bearing.

The sensor holder 7, which carries the sensor 6, includes a positioning portion 9 fitted onto the radially inner surface of the outer race 2 from its first axial end. The positioning portion 9 is formed with a rib 10 which can be fitted in the seal groove 4, which is a circumferential groove formed in the radially inner surface of the outer race 2. The sensor holder 7 is an annular member having circumferential ends. By fitting the positioning portion 9, the sensor holder 7 is supported by the outer race 2. In order to reduce the number of parts, the sensor holder 7 is a monolithic member formed by injection molding.

The sensor holder 7 has a side wall 11 axially facing the magnetic encoder 8. The sensor holder 7 and the magnetic encoder 8 define a labyrinth seal comprising a radial magnetic gap between the radially opposed portions of the sensor holder 7 and the magnetic encoder 8, and the radially inwardly opening gap. The sensor 6 and a connector 13, to which input and output cables are to be connected, are mounted on a circuit board 12 such that when the circuit board 12 is inserted into a recess in the sensor holder 7, the sensor 6 is positioned in the sensor holder 7. In this state, the sensor 6 is molded with resin so that the sensor 6 is held in position by the sensor holder 7. The sensor 6 is held in position relative to the sensor holder 7 such that when the sensor holder 7 is mounted to the outer race 2, the sensor 6 radially faces the encoder portion of the magnetic encoder 8, which is mounted to the inner race 3.

The sensor 6 may be of any type provided it can be held in position by the sensor holder 7. The sensor 6 and other components may be mounted on the surface of the circuit board 12. Otherwise, wires and various elements may be directly soldered to the circuit board. The magnetic sensor of the magnetic rotation sensor unit may include a plurality of sensor elements individually mounted on the circuit board. But preferably, the plurality of sensors should be arrayed in an integrated circuit to omit the steps of assembling the sensor. The integrated circuit should include a built-in multiplying circuit to increase the resolution of the sensor 6 and thus expand the application of the bearing with the sensor. The sensor 6 and the circuit board 12 are retained in position and/or sealed using e.g. thermosetting resin, silicone rubber or a hot melt.

The sensor holder 7 has circumferential ends 19. The side wall 11 of the sensor holder 7 is formed with an annular groove 14 extending between the circumferential ends 19 of the sensor holder 7 and has circumferential ends. The annular groove 14 has an open axial side. With the sensor holder 7 supported on the outer race 2, a spring member 15 shown in FIG. 3(*a*) is fitted in the groove 14 in a radially compressed state as shown in FIG. 2.

Figure 3A:
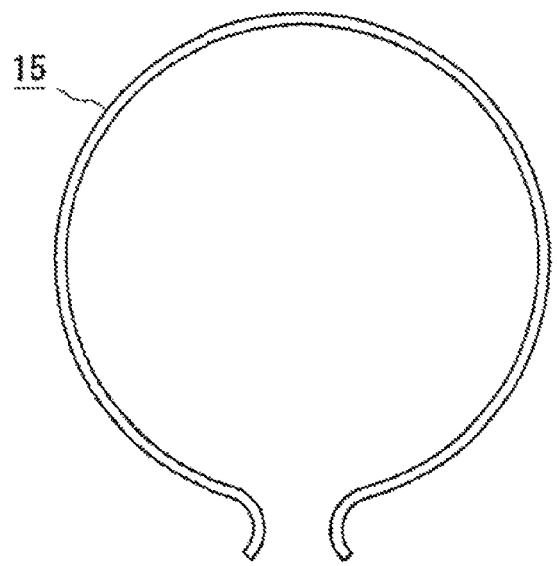
FIG. 3(a) is a side view showing an unstressed spring member according to the first embodiment.
Figure 3B:
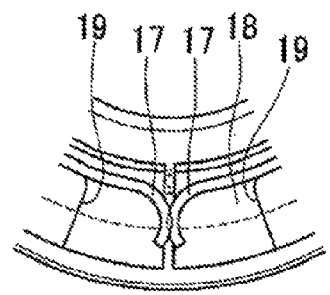
FIG. 3(b) is an enlarged view showing the vicinity of opposite end portions of the spring member when a main portion of the spring member of FIG. 3(a) is fitted in an annular groove of the sensor holder.

As shown in FIGS. 2 and 3(*a*), the spring member 15 is an annular member having opposed circumferential ends and configured to be fitted in the annular groove 14. The spring member 15 comprises a C-shaped, snap ring-shaped, circular main portion 16, and circumferential end portions 17 circumferentially protruding from the respective circumferential ends of the annular groove 14. Each of the circumferential end portions 17 has a portion radially outwardly protruding from the main portion 16. These radially outwardly protruding portions are arcuately bent as viewed from one side in an unstressed state.

An open recess 18 is formed in one axial side surface of the sensor holder 7 into which the circumferential end portions 17 of the spring member 15 protrude.

From the unstressed state shown in FIG. 3(*a*), the main portion 16 of the spring member 15 is radially compressed until the circumferential end portions 17 axially overlap with each other as shown in FIG. 3(*b*). In this state, the spring member 15 is fitted into the annular groove 14 from the axial side. The radially compressed main portion 16 thus elastically radially outwardly expands, pressing against the radially outer wall of the annular groove 14. In this state, as shown in FIG. 2, the spring member 15 is fitted in position in the annular groove 14 due to frictional engagement between the main portion 16 and the annular groove. Further in this state, the sensor holder 7 is elastically radially outwardly pushed by the radially compressed main portion 16 such that circumferential ends 19 of the sensor holder 7 are pushed away from each other. The main portion 16 thus elastically and rigidly fixes the sensor holder 7 in position.

As shown in FIG. 3(*b*), with the main portion 16 fitted in the annular groove 14, the arcuate portions of the circumferential end portions 17 still axially overlap with each other. In this state, when one of the end portions 17 is displaced axially until the extreme ends of the end portions 17 meet at a single axial point, the end portions 17 are deflected such that spring forces F are produced in the directions of the chord of the circular section of the sensor holder, away from the above single axial point. The forces F thus increase the force with which the main portion 16 pushes the sensor holder 7 radially outwardly. The sensor holder 7 can thus be fixed in position more strongly.

In the first embodiment, the C-shaped, snap ring-shaped circular main portion 16 serves to more strongly fix the sensor holder 7 to the outer race in the same manner as the conventional arrangement. In the first embodiment, the elastic force due to the deflection of the end portions 17 of the spring member also serves to more strongly fix the sensor holder 7 to the outer race. Thus, the sensor holder 7 can be more strongly fixed to the outer race than in the conventional arrangement.

As shown in FIGS. 2 and 3(*a*), the spring member 15 is formed by bending a wire. As is apparent from the sectional shape of the main portion 16, the spring member 15 is made of a wire having a square cross-section and having a surface extending in parallel to the axis of the wire. The circumferential end portions 17 have abutment surfaces which are portions of the above surface. The end portions 17 are bent radially outwardly so that their respective abutment surfaces can be brought into abutment with each other. Since the spring member is made of a wire having a square section, the abutment surfaces of the respective portions 17 are less likely to disengage from each other compared to a spring member made of a wire having a round cross-section. In order to uniformly press both ends of the sensor holder 7, the abutment surfaces are preferably brought into abutment with each other on a plane including the axis of the bearing and the circumferential bisection of the sensor holder 7.

When the circumferential end portions 17 of the spring member are brought into abutment with each other, the end portions 17 are axially supported by a flat bottom surface perpendicular to the axis of the open recess 18. Since the end portions 17 are located in the open recess 18, which has an axial step, the abutment surfaces of the end portions 17 never axially separate from each other. Since the end portions 17 are located in the open recess 18 in abutment with each other, the end portions 17 can be prevented from coming in contact with other portions.

The spring member 15 may be formed of a wire having a round cross-section or a leaf spring. The end portions 17 are not limited to being bent in a radially outward direction. The end portions 17 may be of any shape as long as a force by which the circumferential end portions of the main portion 16 are pushed by elastic recovery resulting from the deflection is produced so as to become strong. If the abutment surfaces of the end portions 17 have an arcuate shape having reversal symmetry as viewed from one side in an unstressed state, a radial offset between the abutting end portions 17 may be allowed. If the end portions 17 of the spring member 15 formed of a formed-wire spring are bent in the arcuate shape by protruding in the radially outward or inward direction as in the first embodiment, the spring member 15 may be pinched using snap ring pliers.

Figure 4:
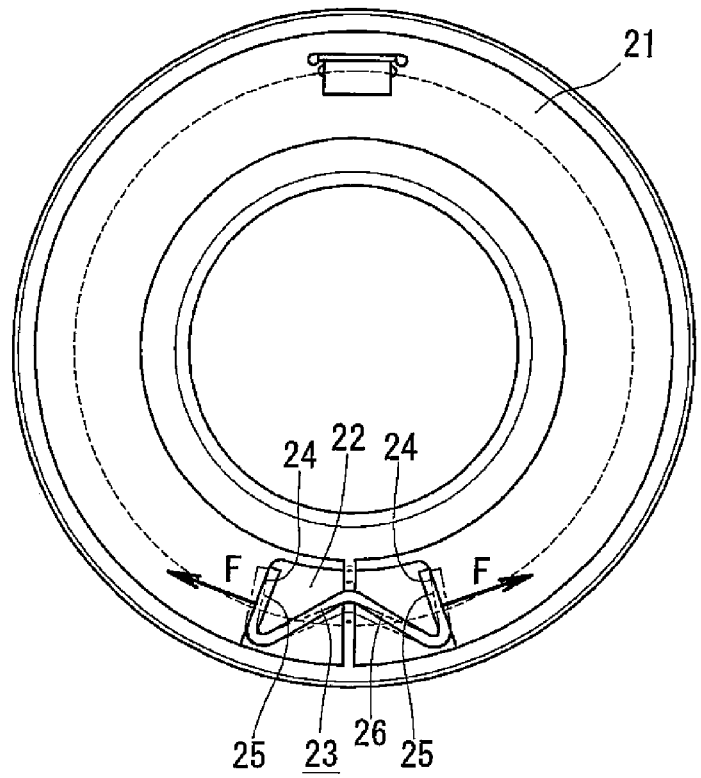
FIG. 4 is a side view showing a bearing assembly with a sensor according to a second embodiment from a first axial side.

The bearing assembly with a sensor according to a second embodiment of the present invention will be described with reference to FIG. 4. Hereinafter, a description will be mainly made of a difference between the first embodiment and the second embodiment, but not a configuration considered to be same as the first embodiment. As shown, in the second embodiment, with a sensor holder 21 supported on an outer race, a spring member 23 is mounted in an open recess 22 of the sensor holder 21 in a compressed state. Thereby, opposite circumferential ends 24 of the sensor holder 21 are biased away from each other by elastic recovery of the spring member 23, and the sensor holder 21 is allowed to be strongly fixed in position.

The spring member 23 includes opposite free end portions 25 adapted to be deflected when pushed in between the opposite circumferential ends 24 of the sensor holder 21, and an intermediate portion 26 that connects the opposite free end portions 25 together. The free end portions 25 are configured to be able to be freely deflected in directions in which the free end portions 25 move toward each other, without coming in contact with the other portion of the spring member 23 from the beginning of the push-in. The spring member 23 is pushed in between circumferential ends of inner walls of the open recess 22, which belong to the opposite circumferential ends 24 of the sensor holder 21. The intermediate portion 26 is a bent spring portion compressed due to the push-in. Since the intermediate portion 26 is bent at one point, the spring member 23 has an M shape when viewed from one side.

An external geometry of the spring member 23 when viewed from one side in an unstressed state is schematically shown in the figure by a two-dot chain line. As is apparent from the comparison of the push-in state of the spring member 23 shown by a solid line with the unstressed state of the spring member 23 shown by the two-dot chain line, when the spring member 23 is pushed into the opposite circumferential ends 24 within the open recess 22, the opposite free end portions 25 are deflected in directions in which they move toward each other, and thus a force causing the opposite circumferential ends 24 to be biased away from each other by the elastic recovery of the free end portions 25 is produced. Thus, the sensor holder 21 can be strongly fixed in position. The spring member 23 is mounted by frictional engagement between the opposite free end portions 25 and the opposite circumferential ends 24 of the sensor holder 21. Furthermore, the intermediate portion 26 that is the bent spring portion is also in a compressed state in which it is deflected in directions in which opposite V-shaped leg portions move toward each other, and thus the force by which the opposite free end portions 25 cause the opposite circumferential ends 24 to be biased away from each other is reinforced by elastic recovery of the intermediate portion 26. As a result, spring forces F by which the sensor holder 21 is strongly fixed in position are increased.

In the second embodiment, in addition to strongly fixing the sensor holder 21 using the opposite free end portions 25 of the spring member 23, which correspond to the conventional circumferentially half-split elastic recovery portions, the spring forces by which the sensor holder 21 is strongly fixed in position by the elastic recovery caused by the deflection of the intermediate portion 26 as the bent spring portion are increased. As such, the sensor holder 21 can be designed to be more strongly fixed in position.

The "M shape" used herein refers to forming a bent portion at one point on the intermediate portion 26 that connects the opposite free end portions 25, and includes, regardless of whether tips of the opposite free end portions 25 are directed in the radially inward or outward direction, a shape in which the free end portions 25 are inclined toward the tips thereof in a circumferential direction or in which tip zones or lengthwise middle zones of the free end portions 25 are bent.

Figure 5:
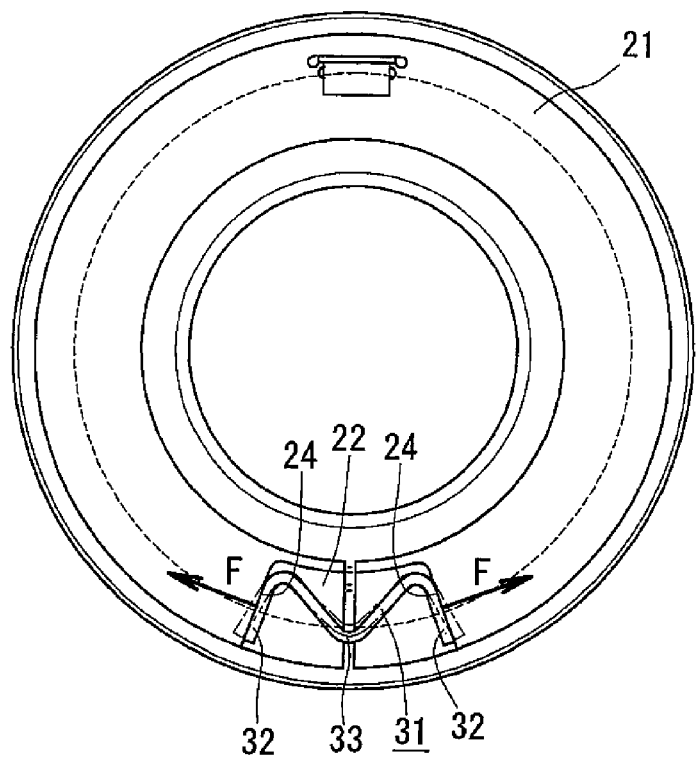
FIG. 5 is a side view showing a bearing assembly with a sensor according to a third embodiment from a first axial side.

For example, a third embodiment is shown in FIG. 5 as a modification that is the reverse of the second embodiment in which the M-shaped spring member 23 is pushed in so that the tips of the opposite free end portions 25 are directed in the radially inward direction. As shown, in the third embodiment, an M-shaped spring member 31 may be pushed into an open recess 22 of a sensor holder 21 so that tips of opposite free end portions 32 thereof are directed in the radially outward direction. An intermediate portion 33 can easily be disposed in the radially inward direction by further reducing a circumferential interval of the intermediate portion 33 compared to the second embodiment. A circumferential interval between opposite circumferential ends 24 of the sensor holder 21 is gradually widened as it goes in the radially outward direction. To secure spring forces F as strong as in the second embodiment, free end portions 32 are inclined so that the circumferential interval between the opposite free end portions 32 is increased as it goes toward tips thereof when viewed from one side in an unstressed state.

The sensor holder 21 may be configured so that the circumferential interval between the opposite circumferential ends 24 thereof gradually becomes narrow as it goes in the radially outward direction.

Figure 6:
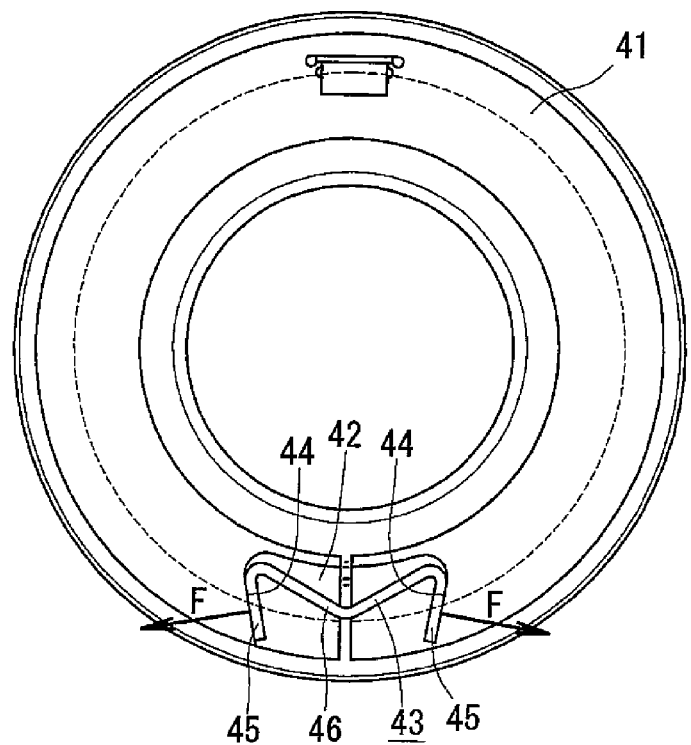
FIG. 6 is a side view showing a bearing assembly with a sensor according to a fourth embodiment from a first axial side.

For example, as shown in FIG. 6, a fourth embodiment is configured so that, when mounted in an open recess 42 of a sensor holder 41, a spring member 43 is pushed in between opposite circumferential ends 44 of the sensor holder 41 which gradually become narrow as they go in a radially outward direction. The spring member 43 has the same M shape as the second embodiment in an unstressed state. To push in the spring member 43 so that tips of opposite free end portions 45 are directed in the radially outward direction, the opposite circumferential ends 44 of the sensor holder 41 gradually become narrow as they go in the radially outward direction. Thus, the opposite free end portions 45 are greatly deflected, and an intermediate portion 46 is loosely compressed, compared to the second embodiment. Generally, spring forces F as strong as in the second embodiment can be secured.

Figure 7:
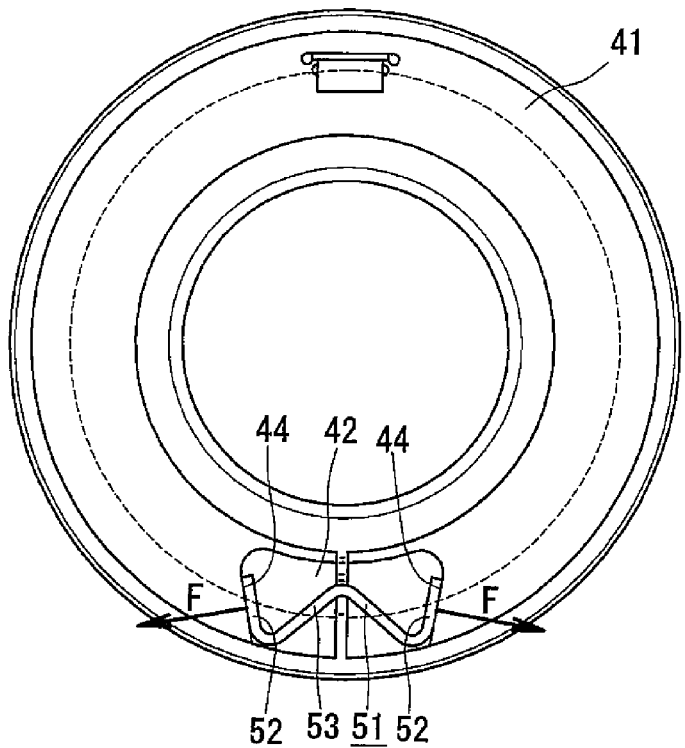
FIG. 7 is a side view showing a bearing assembly with a sensor according to a fifth embodiment from a first axial side.

As shown in FIG. 7, a fifth embodiment may be also configured so that a spring member 51 is pushed in between opposite circumferential ends 44 of a sensor holder 41 so that tips of opposite free end portions 52 thereof are directed in a radially inward direction. The free end portions 52 are further inclined than in the fourth embodiment in proportion to a change in a circumferential interval between the opposite circumferential ends 44. An intermediate portion 53 is formed so as to be narrower in a circumferential direction than in the fourth embodiment in proportion to the change in the circumferential interval between the opposite circumferential ends 44. Generally, obtained spring forces F are equally secured.

Figure 8:
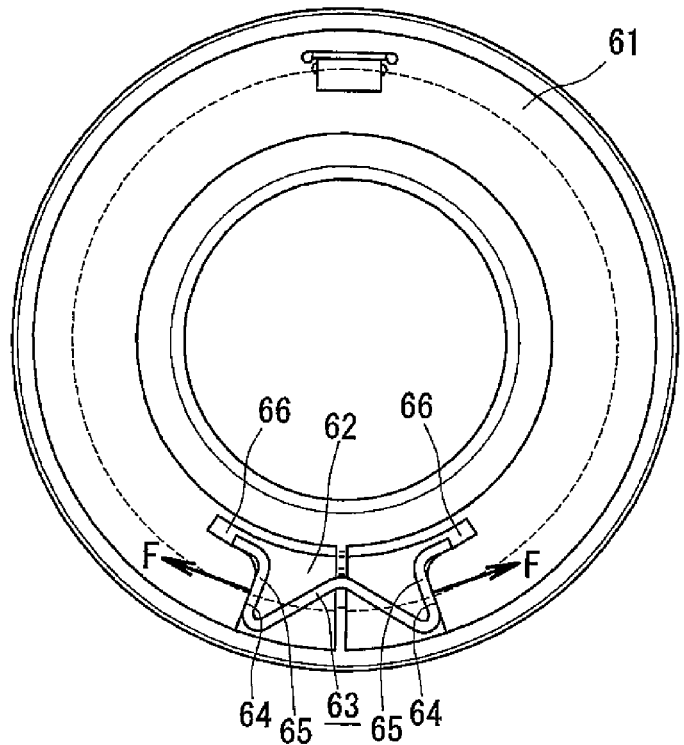
FIG. 8 is a side view showing a bearing assembly with a sensor according to a sixth embodiment from a first axial side.

A sixth embodiment is shown in FIG. 8. As shown, the sixth embodiment is the same as the second to fifth embodiments in that an M-shaped spring member 63 is mounted in an open recess 62 of a sensor holder 61. The sixth embodiment is different from the second to fifth embodiments in that tips of opposite free end portions 65 that are pushed in between opposite circumferential ends 64 of the sensor holder 61 are bent in a direction in which a circumferential interval therebetween becomes wide, thereby further protruding in a circumferential direction than the circumferential ends 64 in the open recess 62 that constitute a contact zone with the circumferential ends of the sensor holder 61 when viewed from one side. In proportion to the protrusion of the tips of the free end portions 65, circumferential ends of inner walls of the open recess 62 are provided with receiving grooves 66, which extend in a circumferential direction in which a circumferential interval therebetween becomes wide, at positions at which the circumferential ends axially face the tips of the free end portions 65. When the spring member 63 is mounted in the open recess 62, the spring member 63 can be positioned in a radial direction by radial hooking of the tips of the opposite free end portions 65 with the receiving grooves 66 of the inner walls of the open recess 62. Thereby, the spring member 63 whose spring force F is enhanced can be made more stable than the case in which it is received only by the opposite circumferential ends 64 of the sensor holder 61.

Figure 9:
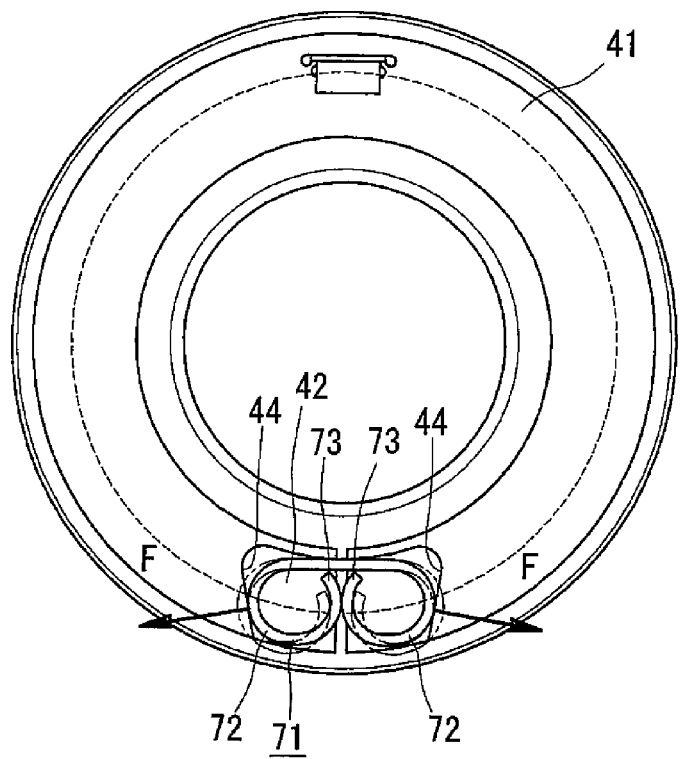
FIG. 9 is a side view showing a bearing assembly with a sensor according to a seventh embodiment from a first axial side.

A seventh embodiment is shown in FIG. 9. As shown, the seventh embodiment is the same as the fourth embodiment in that a spring member 71 is mounted in an open recess 42 of a sensor holder 41 and is provided with circumferential half-split elastic recovery portions, and is different from the fourth embodiment in that the spring member 71 has a shape in which it is rolled from opposite end portions thereof toward the middle thereof. The elastic recovery portions of the spring member 71 are made up of opposite rolled portions 72. As is apparent from the comparison with a shape of the spring member 71 shown by a two-dot chain line when viewed from one side in an unstressed state, the opposite rolled portions 72 are deflected so as to move toward middle sides between opposite circumferential ends 44 due to push-in between the opposite circumferential ends 44 of the sensor holder 41, and middle sides 73 of the opposite rolled portions 72 abut and are deflected. In the seventh embodiment, the opposite rolled portions 72 are deflected toward the middle sides. Elastic recovery forces accumulated by the deflection of the opposite rolled portions 72 moving toward the middle sides between the opposite circumferential ends 44 of the sensor holder 41 act as forces by which counter middle sides of the opposite rolled portions 72 cause the opposite circumferential ends 44 to be biased away from each other. As such, the elastic recovery forces can strongly fix the sensor holder 41. Furthermore, the recovery forces accumulated by the deflection resulting from the abutment of the middle sides 73 of the opposite rolled portions 72 enhance the forces by which the counter middle sides of the opposite rolled portions 72 cause the opposite circumferential ends 44 to be biased away from each other. Accordingly, the spring member of the seventh embodiment can increase spring forces F by which the sensor holder 41 is strongly fixed in position, compared to the spring member having only the opposite free end portions as the elastic recovery portions.

Since the rolled shape of the spring member 71 is an arcuate shape when viewed from one side, it is difficult to receive the spring member 71 in the opposite circumferential ends 44 of the sensor holder 41. Accordingly, the radial positioning of the spring member 71 is preferably reinforced as shown in the figure by inclination at which a circumferential interval between the opposite circumferential ends 44 of the sensor holder 41 is reduced. The opposite rolled portions 72 are not limited to a shape in which they are rolled in the arcuate shape when viewed from one side. The deflection of the opposite rolled portions 72 moving toward the middle sides on the whole by the push-in, and the deflection caused by the abutment of the middle sides 73 take place. As long as the elastic recovery caused by the deflection is effective in strongly fixing the sensor holder 41, the opposite rolled portions 72 may have an appropriate rolled shape.

In the first to seventh embodiments, a material for the spring member can be properly selected from a wire, a plate, or the like. The material is not limited to standard steel, and thus a proper alloy may be used.

Figure 10A:
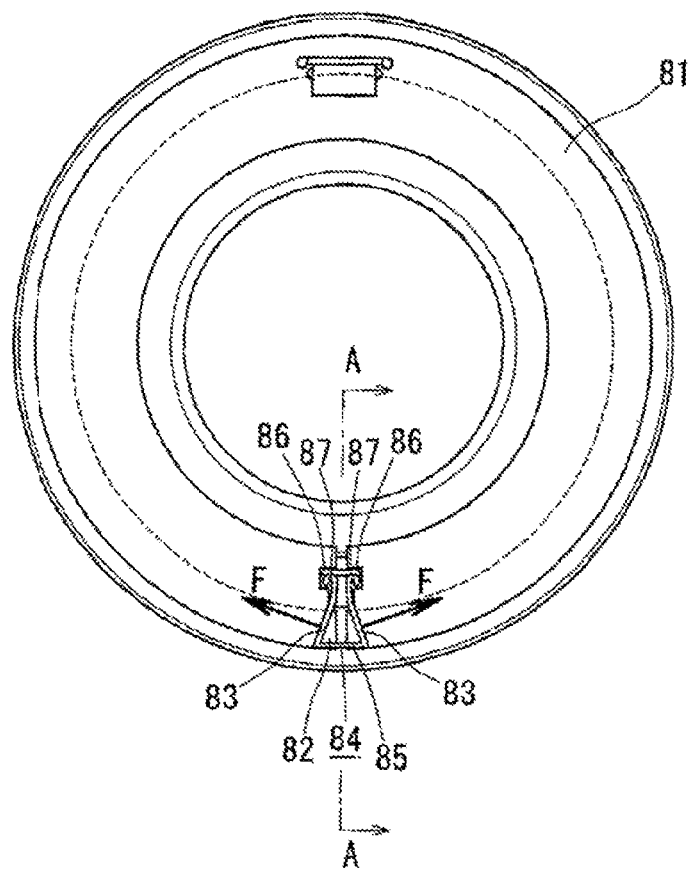
FIG. 10(a) is a side view showing a bearing assembly with a sensor according to an eighth embodiment from a first axial side.
Figure 10B:
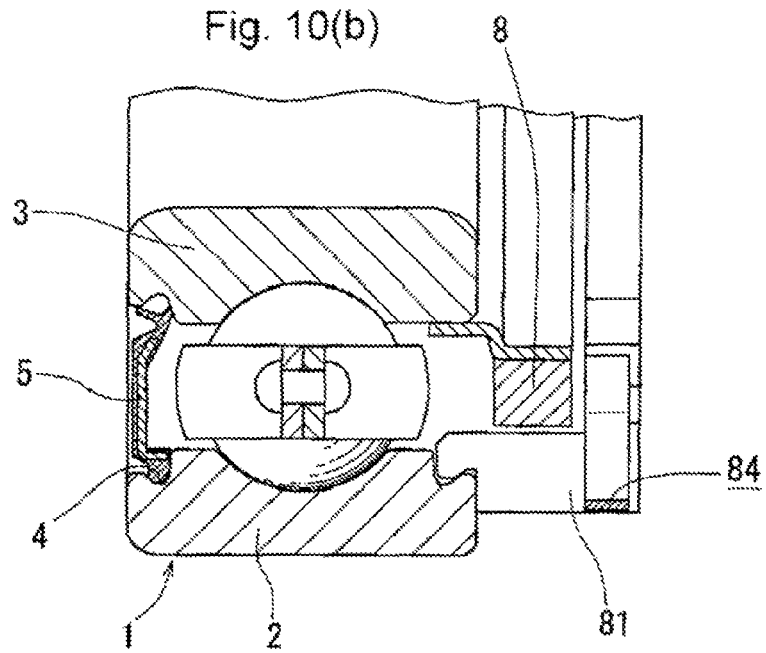
FIG. 10(b) is a sectional view showing main parts of the bearing assembly with a sensor according to the eighth embodiment, in which a bearing central axle and a sensor holder are cut along line A-A from the top at a position at which they are circumferentially bisected.

An eighth embodiment is shown in FIGS. 10(a) and (b). As shown, the eighth embodiment is the same as the second embodiment in that, with a sensor holder 81 supported on an outer race, a spring member 84 includes opposite free end portions 83 pushed in between opposite circumferential ends in an open recess 82. The eighth embodiment is different from the second embodiment in that the spring member 84 is formed of a leaf spring using a planar steel material. The spring member 84 is formed in a C shape in which it is open in a push-in direction when viewed from one side. The open recess 82 is also open in a radially outward direction. The spring member 84 is adapted to be pushed into the open recess 82 in such a manner that tips thereof are radially pushed with the tips directed in a radially inward direction. The opposite free end portions 83 have regions in which a circumferential interval therebetween is gradually reduced from an intermediate portion 85 toward the tips. Opposite circumferential ends in the open recess 82 which receive spring forces F from the opposite free end portions 83 are also inclined in the same direction as the corresponding opposite free end portions 83, and the spring member is easily pushed in from the tips of the opposite free end portions 83 thereof while securing compression of the opposite free end portions 83. The circumferential ends of the sensor holder 81 are provided with steps 86, a circumferential interval between which is wider than that between the circumferential ends receiving the spring forces F. The tips 87 of the opposite free end portions 83 are bent in a direction in which a circumferential interval therebetween widens. Thereby, the tips 87 can be hooked with the steps 86 in a counter push-in direction. Due to this hooking, the spring member 84 is configured to be able to be positioned in a radial direction while forming the inclination facilitating the push-in as described above.

As the planar steel material of which the spring member 84 is formed, a standard stainless steel material, a spring steel plate material, or a cold-rolled steel strip for springs may be used. In a synthetic resin spring, to secure rigidity of the intermediate portion connecting the opposite free end portions, lengths of the opposite free end portions become short when the intermediate portion is thick in the push-in direction and is mounted in the same open recess 82. In the eighth embodiment, since the spring member 84 is formed of the leaf spring using the steel material, the intermediate portion 85 is thinned in the push-in direction using high rigidity of a steel plate, so much that the opposite free end portions 83 are lengthened in the push-in direction, thereby enhancing an elastic recovery characteristic. The forces F by which the opposite free end portions 83 cause the opposite circumferential ends of the sensor holder 81 to be biased away from each other can be enhanced, i.e., the force F by which the sensor holder 81 is strongly fixed in position can be increased.

Figure 11A:
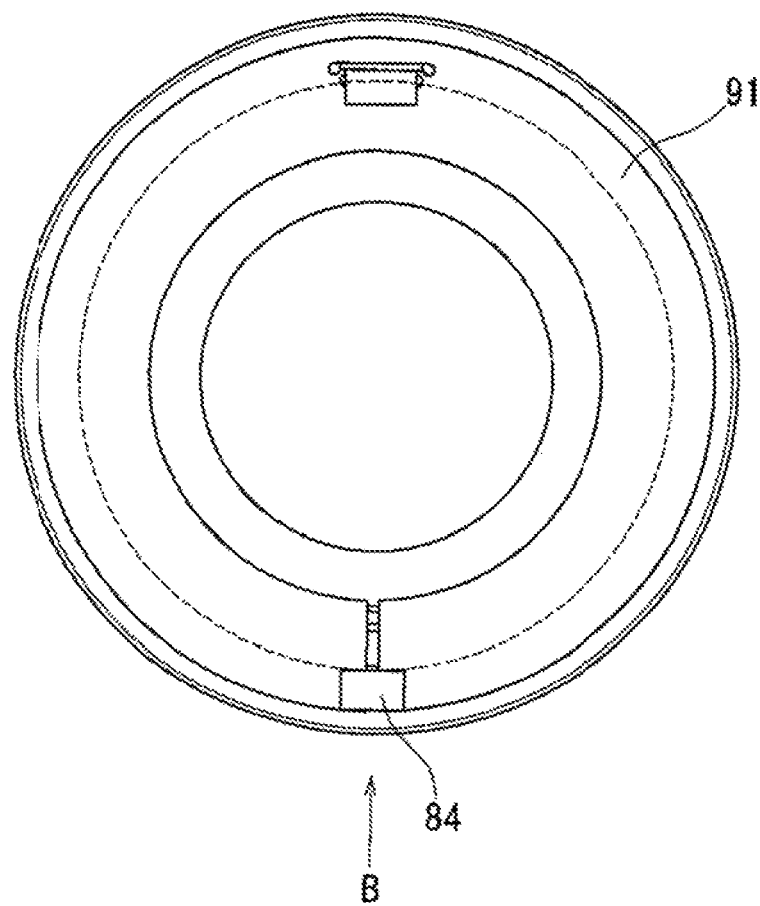
FIG. 11(a) is a side view showing a bearing assembly with a sensor according to a ninth embodiment from a first axial side.
Figure 11B:
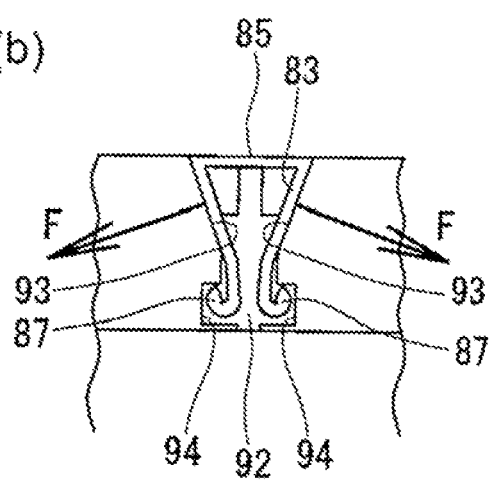
FIG. 11(b) is a plan view showing an open recess of the bearing assembly with a sensor according to the ninth embodiment when viewed from a radially outer side toward arrow B.

Even when the C-shaped spring member 84 is employed, the push-in direction may be set to an axial direction starting from a first axial side. For example, as shown in FIGS. 11(*a*) and (*b*), a ninth embodiment may be configured so that opposite circumferential ends 93 receiving spring forces F are formed in an open recess 92 of a sensor holder 91 from the first axial side toward the second axial side, and steps 94 are further formed on the second axial side.

Figure 12:
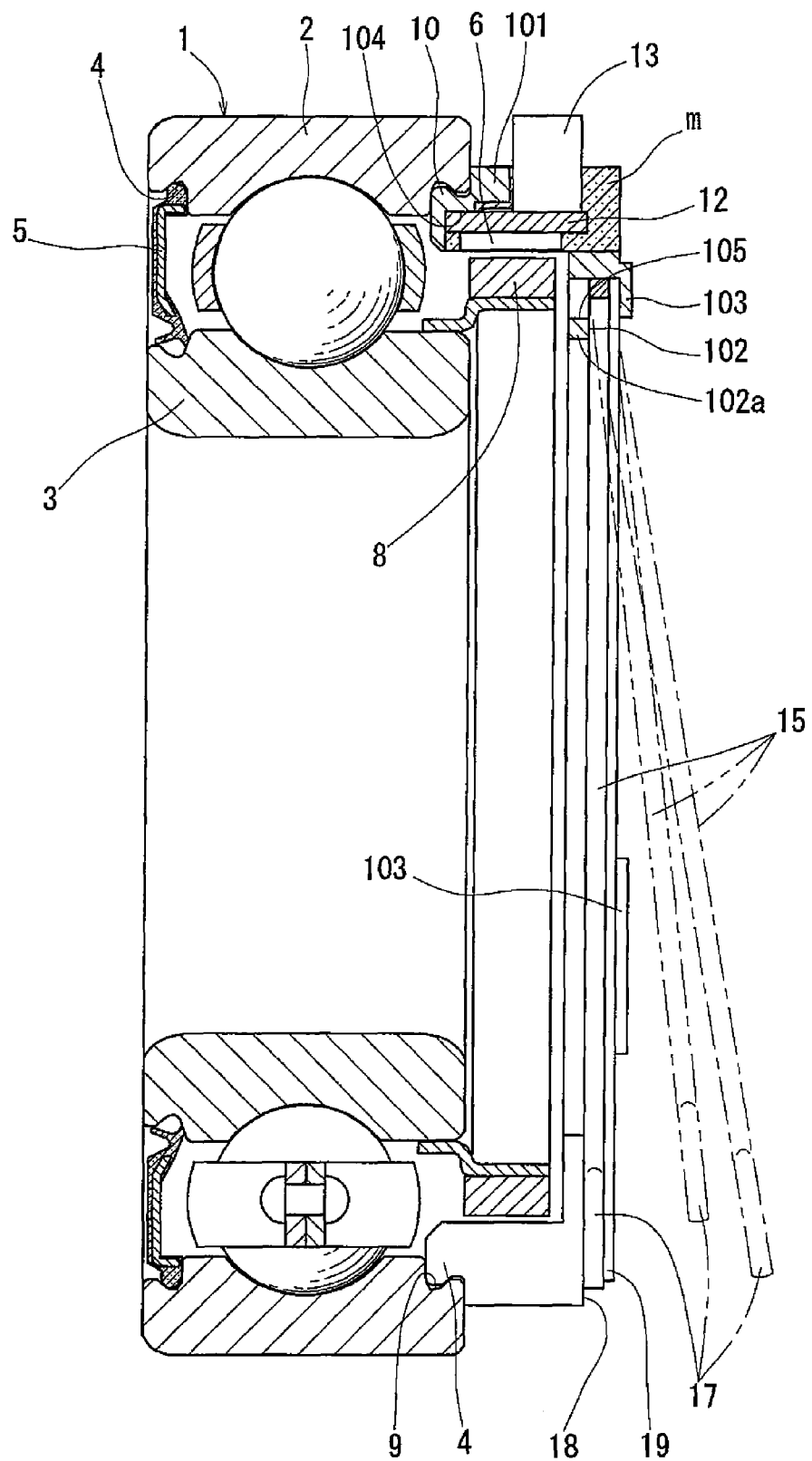
FIG. 12 is a sectional view showing a bearing assembly with a sensor according to a tenth embodiment, in which a bearing central axle and a sensor holder are cut from the top at a position at which they are circumferentially bisected.
Figure 13:
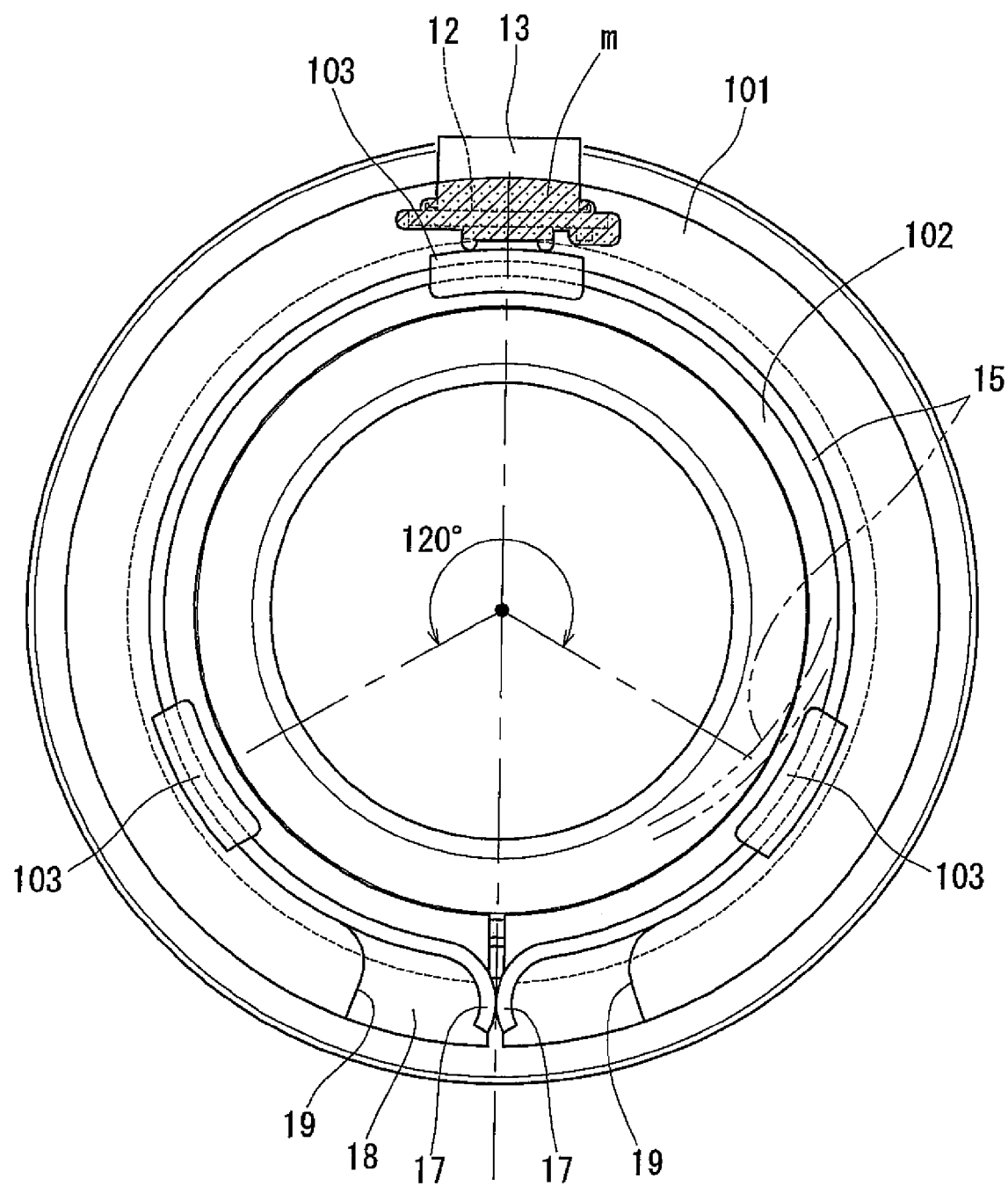
FIG. 13 is a side view showing the bearing assembly with a sensor of FIG. 12 from a first axial side.
Figure 16C:
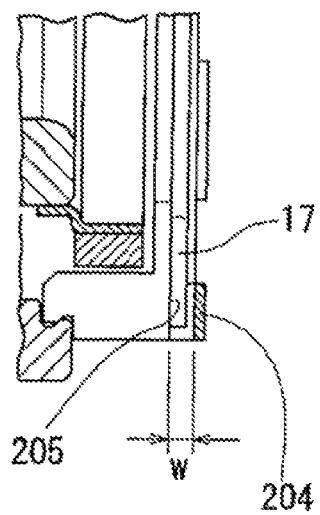
FIG. 16(c) is a sectional view taken along line c-c of FIG. 16(b).
Figure 16A:
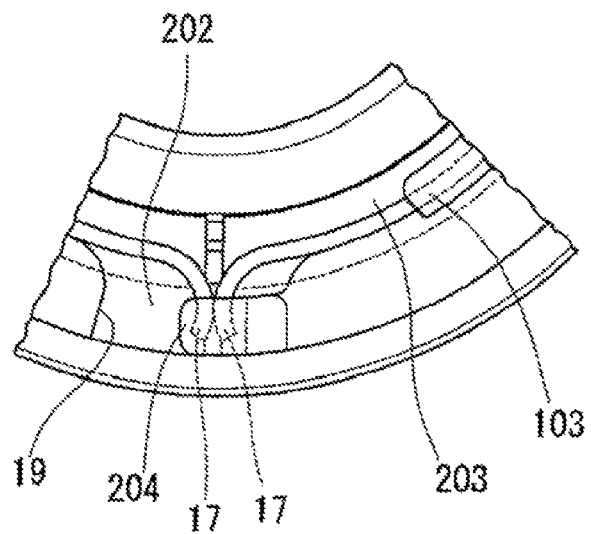
FIG. 16(a) is an enlarged view of an end stop structure of FIG. 15(b)
Figure 16B:
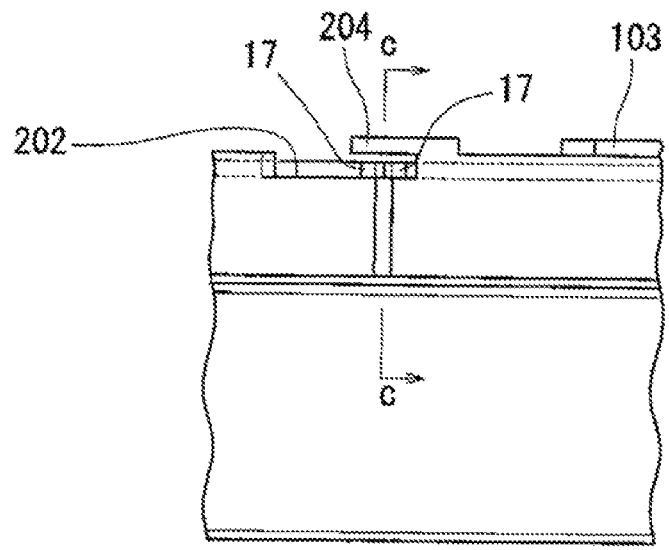
FIG. 16(b) is a bottom view of FIG. 16(a)

As a modification of the first embodiment, a tenth embodiment is shown in FIGS. 12 to 14(*c*). As shown in FIGS. 12 and 13, the tenth embodiment is different from the first embodiment in that anti-separation portions 103, which axially face a spring member 15 abutting a sensor holder 101 from the first axial side, are formed on a surface of the first axial side of the sensor holder 101.

With the spring member 15 mounted, one circumferential point located at a side diametrically opposite a facing gap between opposite circumferential ends 19 of the sensor holder 101 fixed to an outer race 2 is set to the middle (indicated in FIG. 13 by a one-dot chain line in an upward/downward direction), and the anti-separation portions 103 are installed on opposite circumferential sides of the sensor holder 101, respectively. The anti-separation portion 103 is also installed at the middle. The anti-separation portions 103 of the three points are installed in a relation in which they are equidistantly circumferentially arranged at the middle and at each point, at which each circumferential side is ahead of the middle by an angle of 120°. An annular groove 102 is open to the first axial side surface of the sensor holder 101 at another circumferential point other than the three points for the anti-separation portions 103, and is formed so as to be open in a radially inward direction. As a result, a circumferential gap is formed between the anti-separation portions 103 located nearest and next nearest the circumferential end 19 on the same side as each circumferential side of the sensor holder 101 in a circumferential direction. As such, reduction to a minimum diameter that is required to fit the spring member 15 in the annular groove 102 is shown in FIG. 13 with the spring member 15 selectively shown by a two-dot chain line.

In detail, the spring member 15 is inclined as shown in FIG. 12 by a one-dot chain line. The middle anti-separation portion 103 is pulled from the first axial side of the sensor holder 101 and from the radially inner side. On the basis of an approximately circumferential middle portion thereof, the spring member 15 is inserted into the annular groove 102 at the middle portion. As a result, the approximately circumferential middle portion of the spring member 15 is positioned in the axial direction. In this state, the remaining insertion portion of the spring member 15 is pushed, and thus opposite end portions 17 of the spring member 15 are brought in contact with each other until the diameter of the spring member 15 is reduced. The remaining insertion portion of the spring member 15 can be inserted into the annular groove 102 by pulling the nearest anti-separation portion 103 from the radially inner side. In this way, the remaining insertion portion of the spring member 15 can be inserted into the annular groove 102 with the approximately circumferential middle portion of the spring member 15 positioned in the axial direction, and abut a groove sidewall of the other axial side of the annular groove from the first axial side. This abutment allows the spring member to be supported in the radial direction, and thus the fitting can be terminated. When the fitting is terminated, the spring member 15 is shown in FIG. 12 by a solid line.

If the nearest anti-separation portion 103 goes up to a circumferential point nearer the middle anti-separation portion 103, the spring member 15 is required to be further bent in the radially inward direction than the two-dot chain line shown in FIG. 13. As is apparent from this, since the spring member 15 can be inserted into the annular groove 102 through the circumferential gap between the opposite circumferential sides of the sensor holder 101, the tenth embodiment can easily fit the spring member 15 while adding the anti-separation portions 103.

Further, the opposite end portions 17 of the spring member 15 generally pass through a circumferentially abutting position on the diametrical line defining the middle. Accordingly, the tenth embodiment allows the spring member 15 to be well-balanced on an entire circumferential zone by the anti-separation portions 103 of the three points while easily fitting the spring member 15.

Each anti-separation portion 103 is integrally formed with the sensor holder 101. To this end, as shown in FIGS. 14(*a*)-(*c*), holes 105 axially pass through a groove sidewall 102*a* of the other axial side of the annular groove 102 to remove a slide die for molding the anti-separation portions 103. This is because, when the anti-separation portions 103 are molded by a die divided in an axial direction, it is difficult to mold the anti-separation portions 103 using the die forcibly removed toward the first axial side. Further, since the holes 105 correspond to circumferential arrangement of the anti-separation portions 103, a number and size sufficient to hinder the spring member 15 from being supported on the groove sidewall 102*a* in the radial direction are impossible.

In the tenth embodiment, as shown in FIGS. 12 and 13, due to a variation in which the connector 13 is directed in a radially outward direction, a circuit board 12 on which a sensor 6 and the connector 13 are mounted is inserted and positioned in a recess 104. The recess 104 is open from the sensor holder 101 in the radially outward direction. A fixing and filling portion is adapted to be under necessary protection by a synthetic resin mold m inserted into the recess 104. For the synthetic resin mold m, thermosetting resin such as epoxy resin or urethane resin may be used. In place of this material, hot melt may be employed.

The tenth embodiment employs the anti-separation portions based on the first embodiment by way of example. However, as long as they are useful in preventing the spring member from being separated toward the first axial side, the other embodiments may also properly provide the anti-separation. For example, the anti-separation portions that axially face the free end portions 25, 32, 45, 52 and 65 of the spring members 23, 31, 43, 51 and 63 may protrude from the respective circumferential ends 24, 44 and 64 of the sensor holders 21, 41 and 61 in FIGS. 4, 5, 6, 7 and 8. The anti-separation portions that axially face the rolled portions 72 of the spring member 71 may protrude from the respective circumferential ends 44 of the sensor holder 41 in FIG. 9.

As a modification of the tenth embodiment, an eleventh embodiment is shown in FIGS. 15(*a*)-16(*c*). The eleventh embodiment is different from the tenth embodiment in that, with a spring member 15 mounted and fixed in an outer race, a sensor holder 201 has an end stop structure in which axial displacements of opposite end portions 17 of the spring member 15 are restricted to a range in which the abutment is maintained. The end stop structure prevents the opposite end portions 17 from being different from each other in an axial direction due to, e.g. an impact with the end portions 17 that abut and are deflected. As such, the opposite end portions 17 can be prevented from being separated from the respective abutment counterparts by deflection in the vicinity of the end portions 17.

The end stop structure includes an open recess 202 that is formed so as to be able to axially support the opposite end portions 17 of the spring member 15 at one circumferential end side of the sensor holder 201, and a facing wall portion 204 that forms an axial gap w at a portion moving from the annular groove 203 in the radially outward direction so as to circumferentially run from the open recess 202, between the opposite circumferential ends of the sensor holder 201, and to the other circumferential end side of the sensor holder 201. The one circumferential end side of the sensor holder 201 corresponds to the one circumferential side of the sensor holder 201 as in the tenth embodiment.

The open recess 202 is adapted to be able to fit the spring member 15 into the annular groove 203 at a position at which the opposite end portions 17 of the spring member 15 can be inserted from the first axial side, like the tenth embodiment. When the opposite end portions 17 of the spring member 15 do not overlap in the axial direction, the opposite end portions 17 are supported on a bottom surface of the open recess 202 in the axial direction.

The open recess 202 and the facing wall portion 204 are formed so as to have a support wall flush with the groove sidewall of the other axial side of the annular groove 203, because the entire spring member 15 fitted in the annular groove 203 can be rotated in the circumferential direction while being supported in the axial direction.

Further, the facing wall portion 204 is made up of the support walls that are formed on the opposite circumferential end sides of the sensor holder 201 respectively, and a protruding wall that protrudes from the other circumferential end side to the one circumferential end side of the sensor holder 201 so as to axially define the gap w with the support walls. As such, the facing wall portion 204 is formed so as to circumferentially run from the open recess 202, between the opposite circumferential ends of the sensor holder 201, and to the other circumferential end side of the sensor holder 201. The axial gap w may be set so as to be axially greater than an axial groove depth of the annular groove 203, as long as the end portions 17 of the spring member 15 are not displaced relative to each other in the axial direction. This setting method can absorb the inclination of the protruding wall of the facing wall portion 204 due to a molding error, and prevent the inclined end portion 17 from hitting the protruding wall of the facing wall portion 204 depending on a product when the entire spring member 15 is rotated.

With a main portion 16 of the spring member 15 fitted in the annular groove 203, the opposite end portions 17 of the spring member 15 is axially inserted into the open recess 202, and one of the opposite end portions 17 overlapping in the axial direction is slightly shifted. Thereby, the opposite end portions 17 are located at the same axial position. In this case, as shown in FIG. 15(a), the entire spring member 15 is axially supported on the open recess 202 and the annular groove 203, and the opposite end portions 17 abut and are deflected. In this state, when the entire spring member 15 is circumferentially rotated in a direction in which the opposite end portions 17 move toward the facing wall portion 204, as shown in FIGS. 15(b) and 16(a)-(c), the opposite end portions 17 are received in the axial gap w. In this state, the axial displacements of the opposite end portions 17 can be restricted by the support walls and the protruding wall of the facing wall portion 204. To prevent excessive rotation, the other circumferential end of the sensor holder 201 is provided with an anti-rotation wall that is closer to the one circumferential end than in the tenth embodiment.

As a modification of the tenth embodiment, a twelfth embodiment is shown in FIGS. 17(a) to 19. The twelfth embodiment is different from the tenth embodiment in that abutment counterparts of respective end portions 17 of a spring member 15 are formed on a sensor holder 210 and in that an end stop structure is added.

One circumferential end side of the sensor holder 210 is longer in length of an annular groove 211 than the other circumferential end side of the sensor holder 210. The other circumferential end side of the sensor holder 210 is provided with a support wall 212 protruding up to a circumferential extension of the annular groove 211. Since the length of the annular groove 211 is short at the other circumferential end side of the sensor holder 210, an anti-separation portion 213 of the other circumferential end side of the sensor holder 210 is closer to a circumferential middle anti-separation portion 103 than in the equidistant arrangement position of the tenth embodiment. A runout portion 214 recessed in axial and radially outward directions is formed between the anti-separation portion 213 and the support wall 212.

The end stop structure includes the support wall 212, a first open recess 215a that axially supports one end portion 17 of the spring member 15 at one circumferential end side of the sensor holder 210, a facing wall portion 216 that protrudes so as to form an axial gap at the other circumferential end side of the sensor holder 210, and a second open recess 215b that is formed at a circumferential intermediate portion between the facing wall portion 216 and the support wall 212 so as to line up with the axial gap of the facing wall portion 216. The axial gap is adapted to have a size similar to that of the eleventh embodiment. Further, a relation between support walls of the open recesses 215a and 215b and a groove sidewall of the annular groove 211 is also similar to that of the eleventh embodiment.

The facing wall portion 216 includes support wall surfaces that are formed so as to make the same surfaces as the support walls of the open recesses 215a and 215b, a protruding wall surface that protrudes from the first axial side further than the first open recess 215a at the one circumferential end of the sensor holder 210, and a protruding wall portion that protrudes from the protruding wall surface so as to form the support wall portion of the other circumferential end side of the sensor holder 210 and the axial gap.

Figure 19:
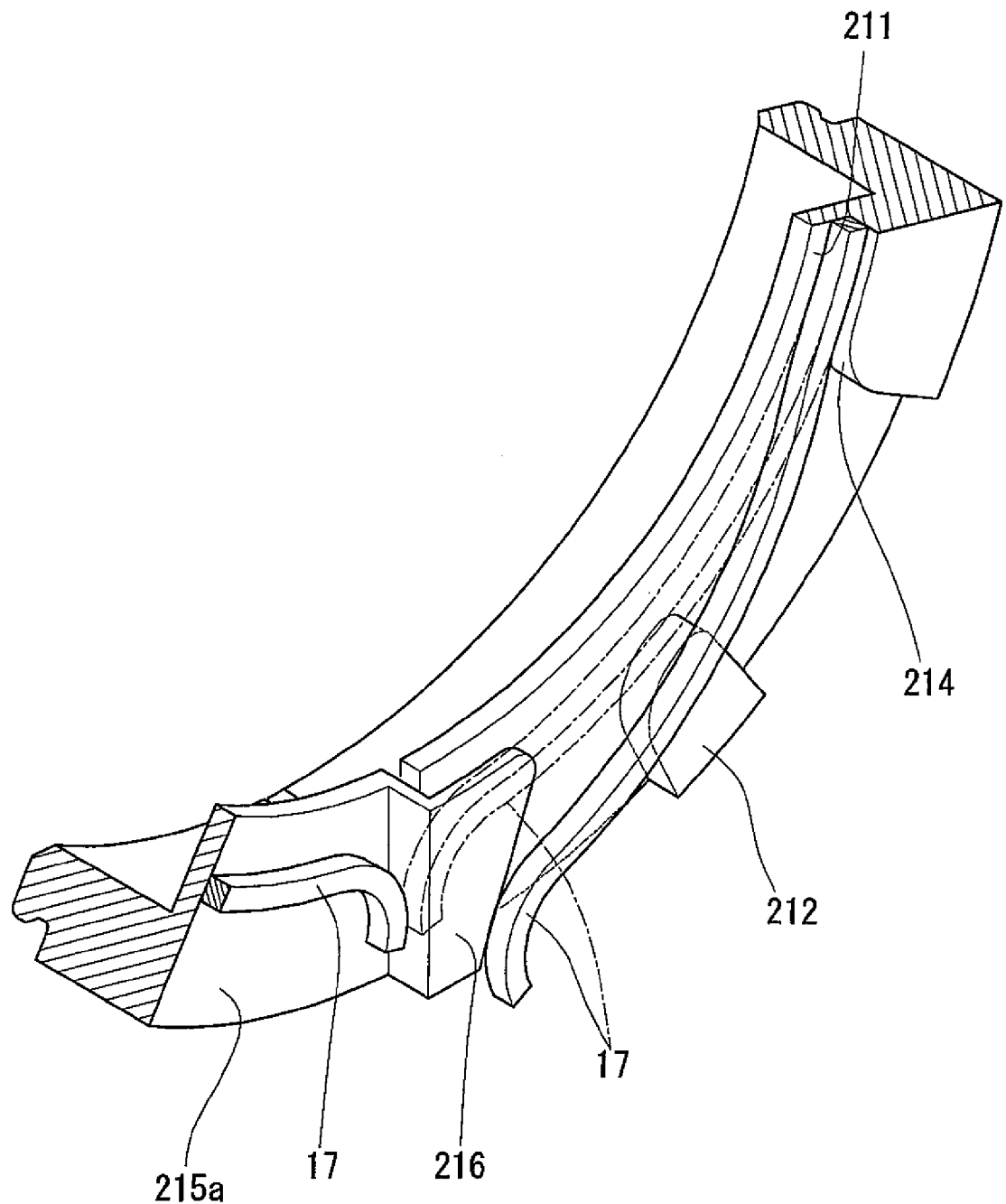
FIG. 19 is an enlarged perspective view of the end stop structure of FIG. 17(a).

Like the tenth embodiment, with a main portion 16 of the spring member 15 fitted in the annular groove 211, as shown in FIG. 17(a), one end portion 17 can be inserted into the first open recess 215a from the first axial side. One end portion 17 axially supported on the first open recess 215a abuts the facing wall portion 216. In this state, as shown in FIGS. 19, 18(b), and 17(a) by a solid line, the other end portion 17 is deflected toward the first axial side in a radially outward direction, thereby crossing the support wall 212, and particularly as shown in FIG. 18(b) by the solid line, the other end portion 17 can be first inserted into the axial gap of the facing wall portion 216. In this process, the runout portion 214 facilitates the deflection in the radially outward direction. Further, as in the other end portion 17 shown in FIG. 19 by a one-dot chain line, the deflection is released. As in the other end portion 17 shown in FIG. 18(b) by a one-dot chain line, when a portion of the spring member 15 which rides on the support wall 212 falls down, the other end portion 17 is radially supported by the support wall 212, as shown in FIG. 18(a). Further, the other end portion 17 abuts one end portion 17 abutting the facing wall portion 216 at the same axial portion as one end portion 17 in the axial gap of the facing wall portion 216. Thus, the opposite end portions 17 are pushed into the facing wall portion 216, respectively, and are deflected. Simultaneously, the axial displacement of the other end portion 17 can be restricted by the facing wall portion 216.

In the aforementioned embodiments, the components including the sensor holder 7 may be formed of a polyamide-imide resin as a main material by injection molding. The portion receiving the spring member 15 of the sensor holder 7 can be prevented from being deformed by temperature creep, and the spring member 15 can be prevented from being separated. Further, as the polyamide-imide resin, AI-polymer-MS (a product series name of Mitsubishi gas chemical Company, Inc) may be employed.

The technical scope of the present invention is not limited to the aforementioned embodiments, and thus includes all modifications and changes departing from the spirit and scope of the present invention as set forth in the appended claims. For example, in the first embodiment, although the opposite end portions of the spring member are bent in the radially inward direction, the spring force may be increased. In the second to sixth embodiments, the intermediate portion may have two or more bending points (e.g. two points for an M shape).

The invention claimed is:

1. A bearing assembly with a sensor, comprising:
a rolling bearing having an outer race to be mounted on a stationary member; a sensor holder that is made of a synthetic resin and carries the sensor,
the sensor holder including a positioning portion fitted onto a radially inner surface of the outer race from a first axial side thereof, the positioning portion including a rib fitted in a circumferential groove formed in the radially inner surface of the outer race, and the sensor holder being an annular member having opposite ends and being supported on the outer race by fitting of the positioning portion onto the radially inner surface of the outer race; and
a spring member configured so that, with the sensor holder supported on the outer race, the spring member can be mounted to the sensor holder in a compressed state so that the sensor holder is fixed in position on the outer race by an elastic recovery force of the spring member;
wherein the spring member is an annular member having ends and fitted in an annular groove formed in the sensor holder to extend between the opposite ends of the sensor holder;
wherein the spring member includes a main portion fitted in the annular groove of the sensor holder, and opposite end portions circumferentially protruding from the annular groove, the opposite end portions of the spring, member having mutually-facing, circumferentially-facing surfaces abutting each other with the main portion fitted in the annular groove so as to cause the opposite end portions of the spring member to be deflected outwardly to increase spring forces by which the sensor holder is fixed in position on the radially inner surface of the outer race by elastic recovery of the opposite end portions.

2. The bearing assembly according to claim 1, wherein the spring member is configured so that the spring member can be mounted to the sensor holder in such a manner that the opposite end portions of the spring member overlap in an axial direction with the main portion fitted in the annular groove, and such that when the opposite end portions are located at a same axial position by shifting one of the opposite end portions, the opposite end portions abut each other and are deflected.

3. The bearing assembly according to claim 1, wherein the spring member comprises a wire spring, a first axial side surface of the sensor holder includes an open recess to which the opposite end portions of the spring member are exposed, and with the opposite end portions of the spring member abutted against each other, the opposite end portions are supported in an axial direction by a bottom surface of the open recess.

4. The bearing assembly according to claim 3, wherein the spring member is formed of a square-sectional wire so that the mutually-facing, circumferentially-facing surfaces constitute axially extending surfaces.

5. The bearing assembly according to claim 1, wherein the sensor holder has an end stop structure which, with the spring member mounted and fixed to the outer race, restricts axial displacement of at least one of the opposite end portions of the spring member within a range in which the abutment is maintained.

6. The bearing assembly according to claim 5, wherein the end stop structure includes an open recess that is formed so as to be able to axially support the opposite end portions of the spring member at a first end side of the sensor holder, and a facing wall portion that forms an axial gap so as to circumferentially run from the open recess, between the opposite ends of the sensor holder, and to a second end side of the sensor holder, and
wherein the end stop structure is arranged such that the opposite end portions of the spring member can be inserted into the open recess from the first axial side with the main portion fitted in the annular groove; when the opposite end portions of the spring member are located at the same axial position by shifting one of the opposite end portions of the spring member, the opposite end portions of the spring member which are axially supported in the open recess and the annular groove abut and are deflected; and, in this state, when the entire spring member is circumferentially rotated in directions in which the opposite end portions of the spring member move toward the facing wall portion, the opposite end portions of the spring member are received in the axial gap.

7. The bearing assembly according to claim 5, wherein the end stop structure includes a support wall that protrudes up to a circumferential extension of the annular groove at a first end side of the sensor holder in which a length of the annular groove is shorter than that at a second end side of the sensor holder, a first open recess that axially supports a first end portion of the spring member at the first end side of the sensor holder, a facing wall portion that protrudes so as to form an axial gap at the second end side of the sensor holder, and a second open recess that is formed at a circumferential intermediate portion between the facing wall portion and the support wall so as to line up with the axial gap of the facing wall portion, and
wherein the end stop structure is arranged so that the first end portion of the spring member can be inserted into the first open recess from the first axial side with the main portion fitted in the annular groove; the first end portion of the spring portion which is axially supported in the first recess abuts the facing wall portion; in this state, a second end portion of the spring member is deflected toward the first axial side and in a radially outward direction, and is inserted into the axial gap across the support wall; and when the deflection is released again, the second end portion of the spring member abuts the facing wall portion in the axial gap.

8. The bearing assembly according to claim 1, wherein the rolling bearing includes an inner race onto which a magnetic encoder of a rotation sensor unit is fitted, the sensor is a magnetic sensor of the rotation sensor unit, the outer race has seal grooves formed in a radially inner surface thereof at respective end portions, the circumferential groove is the seal groove of the first axial side, and the sensor holder and the magnetic encoder define a labyrinth seal opening in a radially inward direction.

9. The bearing assembly according to claim 1, wherein the spring member abuts the sensor holder from a first axial side thereof, and a first axial side surface of the sensor holder includes anti-separation portions that axially face the spring member.

10. The bearing assembly according to claim 9, wherein the anti-separation portions are integrally formed with the sensor holder.

11. The bearing assembly according to claim 1, wherein the spring member abuts a groove sidewall of a second axial side of the annular groove opposite a first axial side of the annular groove, a first axial side surface of the sensor holder includes anti-separation portions that axially face the spring member.

12. The bearing assembly according to claim 11, wherein a facing gap is provided between the opposite ends of the sensor holder, the anti-separation portions include two anti-separation portions installed on opposite circumferential sides of the sensor holder and a third anti-separation portion located at a circumferential point diametrically opposite the facing gap between the opposite ends of the sensor holder, circumferential gaps are formed between the anti-separation portions, and one of the circumferential gaps is arranged to allow the spring member to be inserted into the annular groove through said one of the circumferential gaps.

13. The bearing assembly according to claim 12, wherein one of the anti-separation portions is installed at a middle of the sensor holder and the other anti-separation portions are installed at each point at which each circumferential side is ahead of the middle by an angle of 120°.

14. The bearing assembly according to claim 1, wherein the sensor holder is formed of injection-molded material containing polyamide-imide resin as a main material.

15. The bearing assembly according to claim 1, wherein the rolling bearing includes an inner race onto which a magnetic encoder of a rotation sensor unit is fitted, the sensor is one of a plurality of magnetic elements of the rotation sensor unit provided on an integrated circuit.

16. The bearing assembly according to claim 15, wherein the magnetic encoder is installed on the inner race of the rolling bearing, and the magnetic sensor is radially opposite to the magnetic encoder.

17. The bearing assembly according to claim 15, further comprising a circuit board on which the sensor and a connector are mounted, wherein the circuit board is inserted into a recess of the sensor holder.

* * * * *